US012451593B2

(12) United States Patent
Zhuang et al.

(10) Patent No.: US 12,451,593 B2
(45) Date of Patent: Oct. 21, 2025

(54) COMMUNICATIONS DEVICE

(71) Applicant: HONOR DEVICE CO., LTD., Guangdong (CN)

(72) Inventors: Dehao Zhuang, Shenzhen (CN); Mei Xue, Shenzhen (CN)

(73) Assignee: HONOR DEVICE CO., LTD., Shenzhen (CN)

(*) Notice: Subject to any disclaimer, the term of this patent is extended or adjusted under 35 U.S.C. 154(b) by 0 days.

(21) Appl. No.: 18/550,164

(22) PCT Filed: Jan. 4, 2023

(86) PCT No.: PCT/CN2023/070439
§ 371 (c)(1),
(2) Date: Sep. 12, 2023

(87) PCT Pub. No.: WO2023/142928
PCT Pub. Date: Aug. 3, 2023

(65) Prior Publication Data

US 2024/0222849 A1 Jul. 4, 2024

(30) Foreign Application Priority Data

Jan. 27, 2022 (CN) ......................... 202210103508.9

(51) Int. Cl.
*H01Q 1/24* (2006.01)
*H01Q 1/00* (2006.01)
*H01Q 9/04* (2006.01)

(52) U.S. Cl.
CPC ............. *H01Q 1/243* (2013.01); *H01Q 1/002* (2013.01); *H01Q 1/246* (2013.01); *H01Q 9/0485* (2013.01)

(58) Field of Classification Search
CPC .......... H01Q 1/24; H01Q 1/243; H01Q 1/002; H01Q 1/246; H01Q 1/36; H01Q 1/422;
(Continued)

(56) References Cited

U.S. PATENT DOCUMENTS 5,952,972 A 9/1999 Ittipiboon et al.
11,929,558 B2 3/2024 Jia
(Continued)

FOREIGN PATENT DOCUMENTS

CN 104931797 A 9/2015
CN 106768335 A 5/2017
(Continued)

OTHER PUBLICATIONS

Franz Kamutzki et al: "Silicate dielectric ceramics for millimetre wave applications", Journal of the European Ceramic Society, vol. 41, Issue 7, 2021, pp. 3879-3894.

*Primary Examiner* — Hoang V Nguyen

(57) ABSTRACT

This application provides a communications device which includes an antenna and a wave dense medium. The wave dense medium is located in an emission direction of the antenna and is spaced apart from the antenna, a dielectric constant of a medium, in the communications device, located on a side that is of the wave dense medium and that is close to the antenna and a dielectric constant of a medium located on a side that is of the wave dense medium and that is away from the antenna are both less than a dielectric constant of the wave dense medium, and a thickness D of the wave dense medium from a surface that is close to the antenna to a surface that is away from the antenna satisfies $0.5\ n\lambda(1-10\%)\leq D\leq 0.5\ n\lambda g(1+10\%)$, where ag is a resonance wavelength of an operating band of the antenna in the wave dense medium.

12 Claims, 22 Drawing Sheets

(58) Field of Classification Search
CPC ... H01Q 9/0485; H01Q 15/08; H01Q 19/0962
See application file for complete search history.

(56) References Cited

U.S. PATENT DOCUMENTS

| | | | | |
|---|---|---|---|---|
| 2016/0294068 | A1* | 10/2016 | Djerafi | H01Q 9/16 |
| 2019/0252771 | A1 | 8/2019 | Yong et al. | |
| 2021/0408683 | A1* | 12/2021 | Jia | H01Q 15/08 |

FOREIGN PATENT DOCUMENTS

| | | | |
|---|---|---|---|
| CN | 107408756 | A | 11/2017 |
| CN | 111146582 | A | 5/2020 |
| CN | 111725604 | A | 9/2020 |
| CN | 112615127 | A | 4/2021 |
| CN | 113346245 | A | 9/2021 |
| EP | 0801436 | A2 | 10/1997 |
| WO | 2020187147 | A1 | 9/2020 |
| WO | 2022001856 | A1 | 1/2022 |

* cited by examiner

COMMUNICATIONS DEVICE

CROSS-REFERENCE TO RELATED APPLICATIONS

This application is a national stage of International Application No. PCT/CN2023/070439 filed on Jan. 4, 2023, which claims priority to Chinese Patent Application No. 202210103508.9 filed on Jan. 27, 2022. The disclosures of both of the aforementioned applications are hereby incorporated by reference in their entireties.

TECHNICAL FIELD

This application relates to the field of antenna technologies, and in particular, to a communications device with an antenna.

BACKGROUND

Currently, signals on frequency bands such as a Sub-6 GHz band, a millimeterwave (mmWave) band, and a terahertz (THz) band are attenuated to different degrees in a process of being transmitted in space. To improve a coverage area of a device (a base station or a terminal), a gain of an antenna is usually increased. To increase the gain of the antenna, a shape, a material, or a size of the antenna may be optimized. However, an antenna such as a mmWave antenna has a small size, and tends to be modular. If a shape, a material, or a size of the antenna is changed, manufacturing difficulty and costs of the antenna are greatly increased, and consequently, a gain of the antenna is difficult to increase.

SUMMARY

Embodiments of this application provide a communications device, to increase a gain of an antenna without interfering with modularization of the antenna.

To achieve the foregoing objective, an embodiment of this application provides a communications device. The communications device includes an antenna and a wave dense medium. The wave dense medium is located in a transmission direction of the antenna and is spaced apart from the antenna, a dielectric constant of a medium, in the communications device, located on a side that is of the wave dense medium and that is close to the antenna and a dielectric constant of a medium located on a side that is of the wave dense medium and that is away from the antenna are both less than a dielectric constant of the wave dense medium, and a thickness D of the wave dense medium from a surface that is close to the antenna to a surface that is away from the antenna satisfies $0.5n\lambda g(1-10\%) \leq D \leq 0.5n\lambda g(1+10\%)$, where n=1, 2, 3, . . . , and λg is a resonance wavelength of an operating band of the antenna in the wave dense medium.

Because the dielectric constant of the medium, in the communications device, located on the side that is of the wave dense medium and that is close to the antenna and the dielectric constant of the medium located on the side that is of the wave dense medium and that is away from the antenna are both less than the dielectric constant of the wave dense medium, compared with the wave dense medium, the medium located on the side that is of the wave dense medium and that is close to the antenna and the medium located on the side that is of the wave dense medium and that is away from the antenna each have a lower dielectric constant, and each are a wave sparse medium. When an electromagnetic wave emitted by the antenna enters the wave dense medium from a wave sparse medium located on the side that is of the wave dense medium and that is close to the antenna, the electromagnetic wave undergoes wavelength division for the first time. It is assumed that a transmitted electromagnetic wave is a first transmitted electromagnetic wave, and a reflected electromagnetic wave is a first reflected electromagnetic wave. The first transmitted electromagnetic wave passes through the wave dense medium and enters a wave sparse medium located on the side that is of the wave dense medium and that is away from the antenna, and undergoes wavelength division for the second time. During wavelength division in the second time, a transmitted electromagnetic wave is a second transmitted electromagnetic wave, and a reflected electromagnetic wave is a second reflected electromagnetic wave. The second reflected electromagnetic wave reversely passes through the wave dense medium and enters the wave sparse medium located on the side that is of the wave dense medium and that is close to the antenna, and a transmitted electromagnetic wave is a third transmitted electromagnetic wave. Based on this, because the thickness D of the wave dense medium from the surface that is close to the antenna to the surface that is away from the antenna satisfies $0.5\ \lambda g(1-10\%) \leq D \leq 0.5\ \lambda g(1+10\%)$, where n=1, 2, 3, . . . , and λg is the resonance wavelength of the operating band of the antenna in the wave dense medium, the thickness of the wave dense medium is an integral multiple of a half wavelength of the antenna in the wave dense medium. The wave dense medium forms a Fabry-Perot resonator. When the electromagnetic wave is reflected from the wave sparse medium to the wave dense medium, there is a phase difference of 180°, and when the electromagnetic wave is transmitted from the wave sparse medium to the wave dense medium, there is a phase difference of 0°. When the electromagnetic wave is reflected from the wave dense medium to the wave sparse medium, there is a phase difference of 0°, and when the electromagnetic wave is transmitted from the wave dense medium to the wave sparse medium, there is a phase difference of 0°. To be specific, there is a phase difference of 180° between the first reflected electromagnetic wave and the electromagnetic wave emitted by the antenna, there is a phase difference of 0° between the electromagnetic wave emitted by the antenna and the first transmitted electromagnetic wave, there is a phase difference of 0° between the first transmitted electromagnetic wave and the second reflected electromagnetic wave, and there is a phase difference of 0° between the second reflected electromagnetic wave and the third transmitted electromagnetic wave. Therefore, there is exactly a phase difference of 180° between the first reflected electromagnetic wave and the third transmitted electromagnetic wave, and this is represented as interference cancelation. Therefore, the Fabry-Perot resonator can implement an anti-reflection effect, and can increase a gain of the antenna.

In a possible implementation, n=1. In this way, the wave dense medium has a small thickness D, and can be installed in a communications device with limited space, to implement thinning of the communications device.

In a possible implementation, the thickness D of the wave dense medium is less than or equal to 2 mm. In this way, installation of the wave dense medium in the communications device with limited space can be facilitated, to ensure thinning of the communications device.

In a possible implementation, the thickness D of the wave dense medium is further greater than or equal to 0.1 mm. In this way, structural strength of the wave dense medium 40 can be ensured, to facilitate installation in the communications device.

In a possible implementation, the thickness D of the wave dense medium may be 0.1 mm, 0.2 mm, 0.4 mm, 0.6 mm, 0.8 mm, 1.0 mm, 1.2 mm, 1.3 mm, 1.4 mm, 1.5 mm, 1.6 mm, 1.7 mm, 1.8 mm, 1.9 mm, or 2.0 mm.

In a possible implementation, the dielectric constant DK of the wave dense medium is greater than or equal to 14 and less than or equal to 40. In this way, when n=1 and the antenna is a mmWave band antenna, the operating band of the antenna is within 24 GHZ~40 GHZ, and the thickness D of the wave dense medium is approximately 1 mm. The structural strength of the wave dense medium can be ensured without affecting thinning of the communications device.

In a possible implementation, a material of the wave dense medium is zirconia ceramic. A dielectric constant DK of the zirconia ceramic is 30. When n=1, the thickness D of the wave dense medium is approximately 1 mm, so that the structural strength of the wave dense medium can be ensured without affecting thinning of the communications device.

In a possible implementation, the antenna and the wave dense medium are spaced apart by air, and the air forms the medium, in the communications device, located on the side that is of the wave dense medium and that is close to the antenna. The air has a small dielectric constant, and exerts small impact on a Fabry-Perot effect of the wave dense medium.

In a possible implementation, a spacing between the antenna and the wave dense medium is greater than 0 mm and less than 10 mm. In this way, small impact is exerted on thinning of the communications device, and an effect of increasing the gain of the antenna by the wave dense medium is good.

In a possible implementation, the spacing between the antenna and the wave dense medium is greater than 0.02 mm and less than 3 mm. In this way, small impact is exerted on thinning of the communications device, and the effect of increasing the gain of the antenna by the wave dense medium is better.

In a possible implementation, the spacing between the antenna and the wave dense medium is greater than or equal to 0.5 mm and less than or equal to 1 mm. In this way, smaller impact is exerted on thinning of the communications device, and the effect of increasing the gain of the antenna by the wave dense medium is better.

In a possible implementation, the communications device further includes a back cover; and the antenna is located on an inner side of the back cover, the wave dense medium is located between the antenna and the back cover and is disposed on an inner surface of the back cover, and the back cover forms the medium, in the communications device, located on the side that is of the wave dense medium and that is away from the antenna. Based on this, optionally, a material of the back cover is plastic or glass. The plastic and the glass each have a small dielectric constant, and exert small impact on the Fabry-Perot effect of the wave dense medium.

In a possible implementation, the communications device further includes a back cover; and the antenna is located on an inner side of the back cover, and the wave dense medium is built in a region that is on the back cover and that is opposite to the antenna. In this way, a thickness of the communications device can be reduced, and thinning of the communications device can be facilitated.

In a possible implementation, a hole that is on the back cover and that is used to build the wave dense medium may be a blind hole, or may be a through hole. When the hole that is on the back cover and that is used to build the wave dense medium is a blind hole, the blind hole may penetrate through an inner surface of the back cover, and may not penetrate through an outer surface of the back cover: or may penetrate through an outer surface of the back cover, and may not penetrate through an inner surface of the back cover. This is not specifically limited herein. When the hole that is on the back cover and that is used to build the wave dense medium is a blind hole, and the blind hole penetrates through the inner surface of the back cover, and does not penetrate through the outer surface of the back cover, a part of the wave dense medium is located on the inner side of the back cover, and the other part is built into the blind hole. When the hole that is on the back cover and that is used to build the wave dense medium is a blind hole, and the blind hole penetrates through the outer surface of the back cover, and does not penetrate through the inner surface of the back cover, a part of the wave dense medium is located on an outer side of the back cover, and the other part is built into the blind hole.

In a possible implementation, when the hole that is on the back cover and that is used to build the wave dense medium is a through hole, the surface that is of the wave dense medium and that is away from the antenna may be flush with the outer surface of the back cover, or may protrude to an outer side of the back cover. Optionally, the surface that is of the wave dense medium and that is away from the antenna is flush with the outer surface of the back cover. In this way, appearance neatness of the communications device can be improved.

In a possible implementation, the communications device further includes a back cover. The antenna is located on an inner side of the back cover, the wave dense medium includes a first part and a second part, and the first part includes a partial region of the back cover; and the second part is located between the first part and the antenna, and the second part is disposed on an inner surface of the first part. In this way, a sum of a thickness of the first part and a thickness of the second part is the thickness of the wave dense medium, and this also facilitates thinning of the communications device. In addition, because the second part is disposed on a surface that is of the first part and that is close to the antenna, an appearance of the communications device is not affected.

In a possible implementation, the second part may alternatively be located on a side that is of the first part and that is away from the antenna, and is disposed on an outer surface of the first part. Alternatively, a part of the second part is located between the first part and the antenna and is disposed on an inner surface of the first part, and the other part is located on a side that is of the first part and that is away from the antenna and is disposed on an outer surface of the first part.

In a possible implementation, the first part and the second part are integrally formed. In this way, complexity of a composition structure of the communications device can be reduced, and assembly efficiency can be improved.

In a possible implementation, the communications device further includes a back cover; and the antenna is located on an inner side of the back cover, the wave dense medium is located on an outer side of the back cover, and the wave dense medium is disposed on an outer surface of the back cover. In this way, the wave dense medium does not occupy internal accommodation space of the communications device, to avoid compressing installation space of another component in the communications device.

In a possible implementation, an orthogonal projection of the antenna on the back cover is a first projection, and an orthogonal projection of the wave dense medium on the back cover is a second projection; and an area of the second projection is greater than an area of the first projection, an edge of the second projection is located outside an edge of the first projection, and the edge of the second projection and the edge of the first projection are spaced apart. In this way, a size of the wave dense medium exceeds a size of the antenna, the wave dense medium can cover the antenna, and the gain of the antenna can be increased as much as possible.

In a possible implementation, the antenna is a millimeterwave band antenna. Compared with a Sub-6 GHz band, a millimeterwave band is characterized by a higher bandwidth, wider connections, a lower latency, and the like. However, a signal on the millimeterwave band is rapidly attenuated in space. Therefore, a gain needs to be increased urgently, to increase a coverage area of the communications device (for example, a base station or a terminal) on the millimeterwave band. In addition, compared with a terahertz band, the millimeterwave band is characterized by low costs, and therefore, has an advantage of a wide application range.

BRIEF DESCRIPTION OF DRAWINGS

FIG. 8A is a directivity diagram of the antenna at 26 GHz when no wave dense medium is disposed, and FIG. 8B is a directivity diagram of the antenna at 26 GHz when a wave dense medium is disposed:

FIG. 9A is a directivity diagram of the antenna at 28 GHz when no wave dense medium is disposed; and FIG. 9B is a directivity diagram of the antenna at 28 GHz when a wave dense medium is disposed:

DESCRIPTION OF EMBODIMENTS

In the embodiments of this application, the terms "include", "have", and any other variant thereof are intended to cover non-exclusive inclusion, so that a process, method, article, or apparatus that includes a series of elements includes not only those elements but also other elements that are not explicitly listed, or includes elements inherent to such a process, method, article, or apparatus. Without more limitations, elements defined by the sentence "including a" does not exclude that there is still another same element in the process, method, object, or apparatus which includes the element.

To increase a gain of an antenna without interfering with modularization of the antenna, a resonator is disposed in a transmission direction of the antenna based on a Fabry-Perot effect (also referred to as an F-P effect) in this application, so that based on an existing modular antenna, the gain of the antenna can be increased without a need to change a shape, a material, and a size of the antenna. Therefore, initial performance of the modular antenna does not need to be interfered with.

The following describes the embodiments of this application in detail with reference to the accompanying drawings. In addition, before the embodiments of this application are described, an application scenario of the embodiments of this application is first described.

This application provides a communications device. The communications device is a communications device having a wireless signal receiving and sending function. Specifically, the communications device may be a portable electronic apparatus or another proper electronic apparatus. For example, the communications device may be a mobile phone, a base station, a tablet computer (tablet personal computer), a notebook computer, a laptop computer (laptop computer), a personal digital assistant (personal digital assistant, PDA), or a wearable device. The wearable device includes but is not limited to a wristband, a watch, augmented reality (augmented reality, AR) glasses, an AR helmet, virtual reality (virtual reality, VR) glasses, a VR helmet, or the like.

Figure 1:
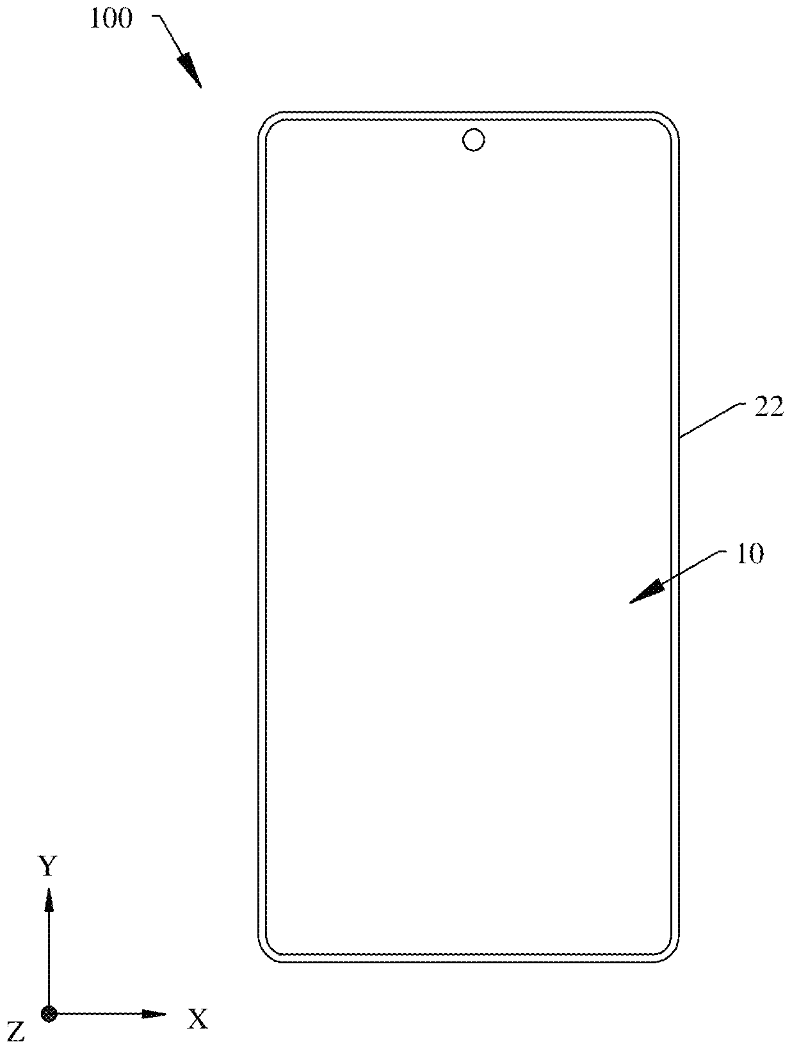
FIG. 1 is a schematic diagram of a structure of a front face of a communications device according to some embodiments of this application.
Figure 2:
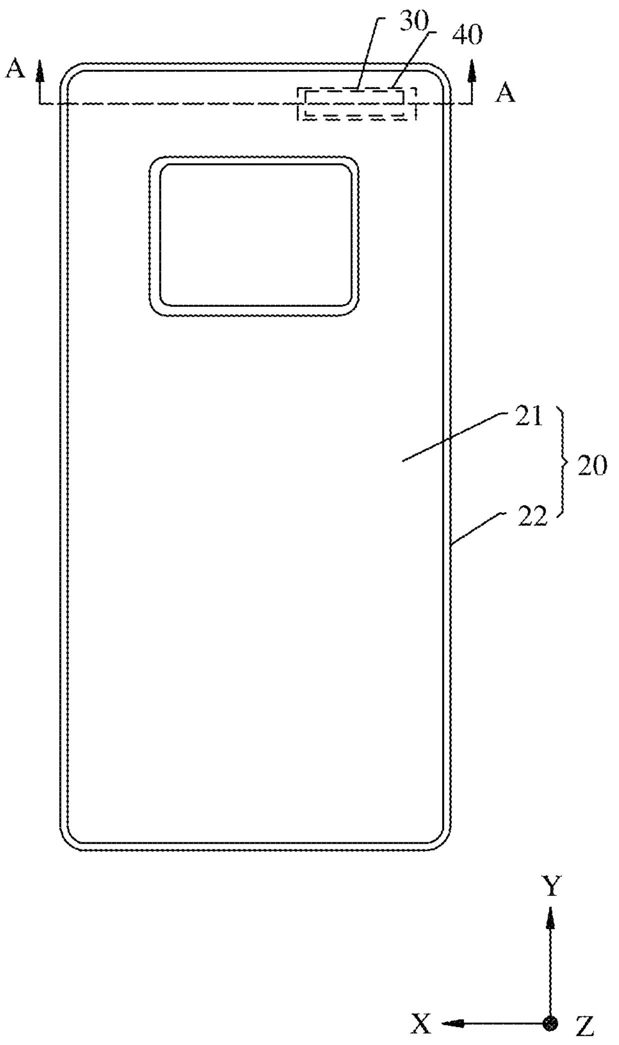
FIG. 2 is a schematic diagram of a structure of a rear face of the communications device shown in FIG. 1.
Figure 3:
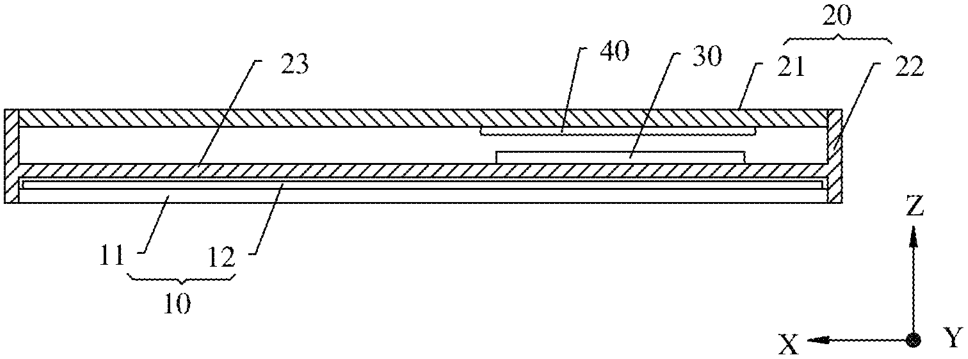
FIG. 3 is a schematic diagram of a cross-sectional structure of the communications device shown in FIG. 2 in a direction A-A.

Refer to FIG. 1-FIG. 3. FIG. 1 is a schematic diagram of a structure of a front face of a communications device 100 according to some embodiments of this application. FIG. 2 is a schematic diagram of a structure of a rear face of the communications device 100 shown in FIG. 1. FIG. 3 is a schematic diagram of a cross-sectional structure of the communications device 100 shown in FIG. 2 in a direction A-A. This embodiment and the following embodiments are all described by using an example in which the communications device 100 is a mobile phone, and this cannot be considered as a special limitation on the communications device 100. The communications device 100 includes a screen 10, a back housing 20, a circuit board (not shown in the figure), and an antenna 30.

For ease of description of the following embodiments, an XYZ coordinate system is established. Specifically, it is defined that a length direction of the communications device 100 is a Y-axis direction, a width direction is an X-axis direction, and a thickness direction is a Z-axis direction. It can be understood that a coordinate system of the communications device 100 may be flexibly set based on an actual requirement. This is not specifically limited herein.

The screen 10 is configured to display an image, a video, or the like. The screen 10 includes a light-transmitting cover plate 11 and a display 12. The light-transmitting cover plate 11 and the display 12 are stacked and fixedly connected. The light-transmitting cover plate 11 is mainly configured to protect the display 12 and prevent dust. A material of the light-transmitting cover plate 11 includes but is not limited to glass. The display 12 may be a flexible display, or may be a rigid display. For example, the display 12 may be an organic light-emitting diode (organic light-emitting diode, OLED) display, an active-matrix organic light-emitting diode or an active-matrix organic light-emitting diode (active-matrix organic light-emitting diode, AMOLED) display, a mini light-emitting diode (mini organic light-emitting diode) display, a micro light-emitting diode (micro organic light-emitting diode) display, a micro organic light-emitting diode (micro organic light-emitting diode) display, a quantum dot light emitting diode (quantum dot light emitting diodes, QLED) display, or a liquid crystal display (liquid crystal display, LCD).

The back housing 20 is configured to protect an internal electronic component of the communications device 100. The back housing 20 includes a back cover 21 and a frame 22. A material of the back cover 21 includes but is not limited to glass, plastic such as polycarbonate (polycarbonate, PC), and ceramic. The back cover 21 is located on a side that is of the display 12 and that is away from the light-transmitting cover plate 11, and is stacked with the light-transmitting cover plate 11 and the display 12. The frame 22 is located between the back cover 21 and the light-transmitting cover plate 11, and the frame 22 is fastened to the back cover 21. For example, the frame 22 may be fastened to the back cover 21 by using an adhesive. The frame 22 may alternatively be integrally formed with the back cover 21. In other words, the frame 22 and the back cover 21 are of an integral structure. The light-transmitting cover plate 11 is fastened to the frame 22. In some embodiments, the light-transmitting cover plate 11 may be fastened to the frame 22 by using an adhesive. The light-transmitting cover plate 11, the back cover 21, and the frame 22 form internal accommodation space of the communications device 100. The internal accommodation space accommodates the display 12.

In some embodiments, the communications device 100 further includes a middle plate 23. The middle plate 23 is disposed between the display 12 and the back cover 21, and the middle plate 23 is fastened to an inner surface of the frame 22. For example, the middle plate 23 may be fastened to the frame 22 by using an adhesive, or the middle plate 23 may be integrally formed with the frame 22. The middle plate 23 is made of a metal material, and the middle plate 23 may be used as a reference ground of an electronic component in the communications device 100.

The circuit board is disposed in the internal accommodation space of the communications device 100. In some embodiments, the circuit board is located between the middle plate 23 and the back cover 21, and the circuit board is fastened to the middle plate 23. The circuit board may be a primary circuit board, or may be a secondary circuit board. This is not specifically limited in this application.

The antenna 30 is disposed in the internal accommodation space of the communications device 100. In some embodiments, as shown in FIG. 3, the antenna 30 is disposed between the middle plate 23 and the back cover 21.

In some embodiments, a radio frequency circuit is disposed on the circuit board, and the antenna 30 is electrically connected to the radio frequency circuit on the circuit board, to transmit a radio frequency signal from the radio frequency circuit to external space in a form of an electromagnetic wave, so as to implement transmission of the signal: or receive an electromagnetic wave from external space, convert the electromagnetic wave into a radio frequency signal, and transmit the radio frequency signal to the radio frequency circuit, to implement receiving of the signal.

The antenna 30 may be a directional antenna, or may be an omni-directional antenna. In some embodiments, as shown in FIG. 3, the antenna 30 may transmit a signal to a side that is of the back cover 21 and that is away from the screen 10. Based on this, the antenna 30 may be further configured to receive an electromagnetic wave signal from the side that is of the back cover 21 and that is away from the screen 10. In some other embodiments, the antenna 30 may alternatively transmit a signal to a side that is of the frame 22 and that is away from the internal accommodation space of the communications device 100, or transmit a signal to a side that is of the screen 10 and that is away from the back cover 21. In this embodiment, descriptions are provided by using an example in which the antenna 30 may transmit a signal to the side that is of the back cover 21 and that is away from the screen 10. This cannot be considered as a special limitation on this application.

It should be noted that, when transmitting a signal to the side that is of the back cover 21 and that is away from the screen 10, the antenna 30 may further transmit a signal to another side, for example, transmit a signal to the side that is of the frame 22 and that is away from the internal accommodation space of the communications device 100, or transmit a signal to the side that is of the screen 10 and that is away from the back cover 21. This is not specifically limited herein.

The antenna 30 includes but is not limited to a Sub-6 GHz band antenna, a millimeterwave (mmWave) band antenna, and a terahertz (THz) band antenna. In some embodiments, the antenna 30 is a mmWave band antenna. A mmWave band is used as one of 5G mobile communication bands. Compared with a Sub-6 GHz band, the millimeterwave band is characterized by a higher bandwidth, wider connections, a lower latency, and the like. However, a signal on the mmWave band is rapidly attenuated in space. Therefore, a gain needs to be increased urgently, to increase a coverage area of the communications device (for example, a base station or a terminal) on the mmWave band. In addition, compared with a THz band, the mm Wave band is characterized by low costs, and therefore, has an advantage of a wide application range. Specifically, when the antenna 30 is a mm Wave band antenna, an operating band of the antenna 30 may be a band n257 (26.5 GHZ-29.5 GHZ), a band n258 (24.25 GHz-27.5 GHZ), or a band n260 (37 GHz-40 GHz). This is not specifically limited herein.

To improve production efficiency of the communications device, the antenna 30 may be used as a module for material supply. In this way, management is facilitated, and the production efficiency of the communications device including the antenna 30 can be improved. However, in this way, it is inconvenient to increase a gain of the antenna 30 by changing a shape, a material, or a size of the antenna 30.

Based on this, to increase the gain of the antenna 30 without interfering with modularization of the antenna 30, as shown in FIG. 2 and FIG. 3, the communications device further includes a wave dense medium 40.

The wave dense medium 40 is a structure used to increase the gain of the antenna 30. In some embodiments, as shown in FIG. 3, the wave dense medium 40 is in a rectangular sheet shape. In some other embodiments, the wave dense medium 40 may alternatively be in a circular sheet shape, an oval sheet shape, a triangular sheet shape, a polygonal sheet shape, or the like.

The wave dense medium 40 is located in a transmission direction of the antenna 30, and the wave dense medium 40 is spaced apart from the antenna 30. Specifically, the wave dense medium 40 may be located between the antenna 30 and the back cover 21, or may be disposed in a region that is on the back cover 21 and that is opposite to the antenna 30, or may be disposed on a side that is of the back cover 21 and that is away from the antenna 30. In some embodiments, still as shown in FIG. 3, the wave dense medium 40 is located between the antenna 30 and the back cover 21, and the wave dense medium 40 is disposed on an inner surface of the back cover 21. The inner surface of the back cover 21 is a surface that is of the back cover 21 and that faces the internal accommodation space of the communications device 100, that is, a surface that is of the back cover 21 and that is close to the screen 10. Specifically, the wave dense medium 40 may be glued to the inner surface of the back cover 21, or may be directly formed on the inner surface of the back cover 21 by using the back cover 21 as a substrate. This is not specifically limited in this embodiment of this application.

Figure 4:
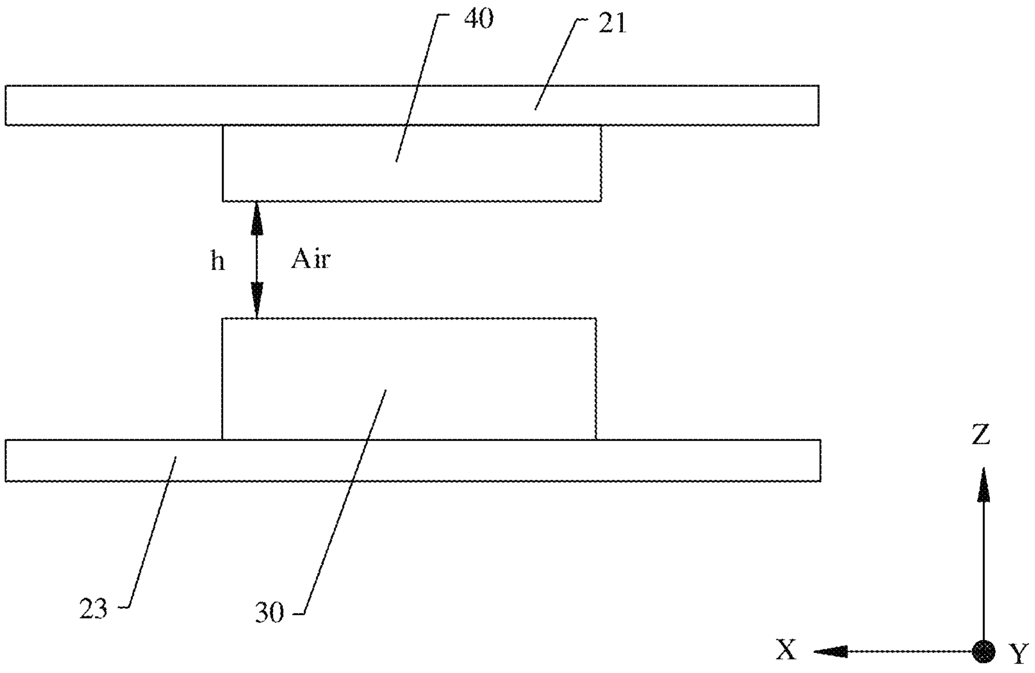
FIG. 4 is a schematic diagram of relative positions of a middle plate, a back cover, an antenna, and a wave dense medium in the communications device shown in FIG. 3.

The wave dense medium 40 and the antenna 30 may be spaced apart by a solid medium, or may be spaced apart by air, or may be spaced apart by at least one layer of solid medium and at least one layer of air. This is not specifically limited herein. In some embodiments, FIG. 4 is a schematic diagram of relative positions of the middle plate 23, the back cover 21, the antenna 30, and the wave dense medium 40 in the communications device 100 shown in FIG. 3. The wave dense medium 40 and the antenna 30 are spaced apart by air. Such a structure is simple, costs of air are low, and it is easy to implement.

A value of a dielectric constant (DK, also referred to as relative permittivity) of a medium, in the communications device 100, located on a side that is of the wave dense medium 40 and that is close to the antenna 30 and a value of DK of a medium located on a side that is of the wave dense medium 40 and that is away from the antenna 30 are both less than a value of DK of the wave dense medium 40. Specifically, the medium located on the side that is of the wave dense medium 40 and that is close to the antenna 30 is a medium that is adjacent to the wave dense medium 40 and that is located on the side that is of the wave dense medium 40 and that is close to the antenna 30. Similarly, the medium located on the side that is of the wave dense medium 40 and that is away from the antenna 30 is a medium that is adjacent to the wave dense medium 40 and that is located on the side that is of the wave dense medium 40 and that is away from the antenna 30. For example, as shown in FIG. 4, the medium located on the side that is of the wave dense medium 40 and that is close to the antenna 30 is air, and the medium located on the side that is of the wave dense medium 40 and that is away from the antenna 30 is the back cover 21. In other words, a value of DK of air and a value of DK of the back cover 21 are both less than the value of DK of the wave dense medium 40. Based on this, plastic or glass with a small value of DK may be selected as a material of the back cover 21. In this way, relative to the wave dense medium 40, the medium located on the side that is of the wave dense medium 40 and that is close to the antenna 30 and the medium located on the side that is of the wave dense medium 40 and that is away from the antenna 30 each have a low dielectric constant, and each are a wave sparse medium.

Figure 5:
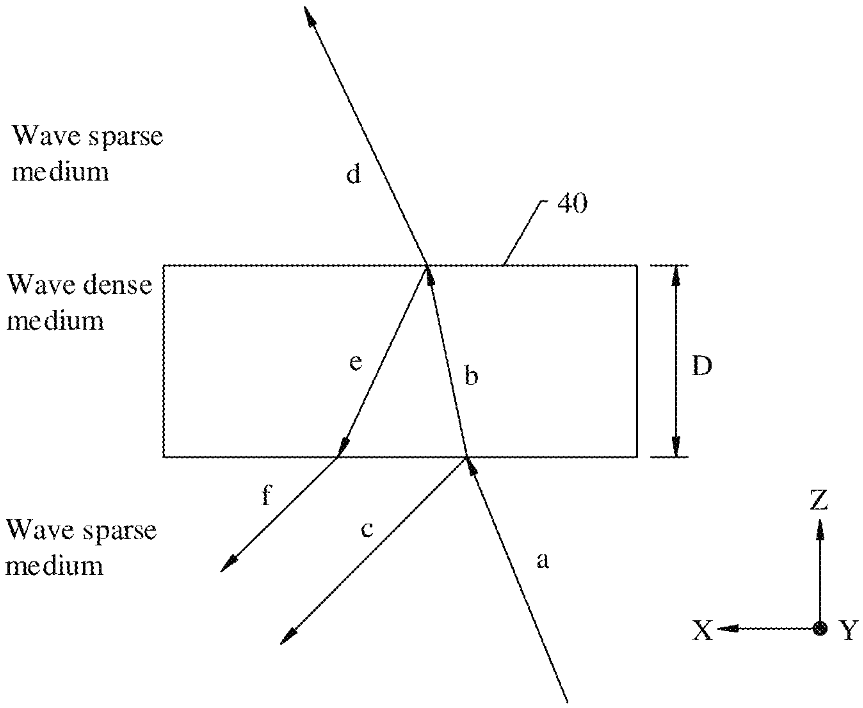
FIG. 5 is a schematic diagram of a transmission path, in a wave dense medium, of an electromagnetic wave emitted by an antenna in the communications device shown in FIG. 4.

FIG. 5 is a schematic diagram of a transmission path, in the wave dense medium 40, of an electromagnetic wave emitted by the antenna 30 in the communications device 100 shown in FIG. 4. When an electromagnetic wave a emitted by the antenna 30 enters the wave dense medium 40 from a wave sparse medium located on the side that is of the wave dense medium 40 and that is close to the antenna 30, the electromagnetic wave undergoes wavelength division for the first time. A transmitted electromagnetic wave is a first transmitted electromagnetic wave b, and a reflected electromagnetic wave is a first reflected electromagnetic wave c. The first transmitted electromagnetic wave b passes through the wave dense medium 40 and enters a wave sparse medium located on the side that is of the wave dense medium 40 and that is away from the antenna 30, and undergoes wavelength division for the second time. A transmitted electromagnetic wave is a second transmitted electromagnetic wave d, and a reflected electromagnetic wave is a second reflected electromagnetic wave e. The second reflected electromagnetic wave e reversely passes through the wave dense medium 40 and enters the wave sparse medium located on the side that is of the wave dense medium 40 and that is close to the antenna 30, and a transmitted electromagnetic wave is a third transmitted electromagnetic wave f.

Based on the foregoing embodiment, because a thickness D of the wave dense medium 40 from a surface that is close to the antenna 30 to a surface that is away from the antenna 30 satisfies $0.5\ \lambda g(1-10\%)\leq D\leq 0.5\ \lambda g(1+10\%)$, where n=1, 2, 3, . . . , and λg is a resonance wavelength of an operating band of the antenna 30 in the wave dense medium 40.

Herein, $\lambda g=\lambda 0/\sqrt{DK}$, λ0 is a resonance wavelength of the operating band of the antenna 30 in a vacuum, $\lambda 0=C_0/F$, $C_0$ is a transmission speed of the electromagnetic wave in the vacuum, $C_0=3\times$ 10^8 m/s, F is the operating band of the antenna 30, and F represents a band range. For example, if the operating band of the antenna 30 is a band n257, F is 26.5 GHZ-29.5 GHZ. Based on this, $\lambda_0$ is also a wavelength range, and is specifically an upper limit of a $C_0/F$ band range to a lower limit of the $C_0/F$ band range. DK is the dielectric constant of the wave dense medium 40, and wave dense media 40 of different materials have different values of DK. Therefore, λg is also a wavelength range. It can be learned that a condition satisfied by the thickness D is: $0.5\ \lambda g(1-10\%)\leq D\leq 0.5\ \lambda g(1+10\%)$. In other words, the thickness D satisfies $0.5\ n\lambda g1(1-10\%)\leq D\leq 0.5 n\lambda g2(1+10\%)$. Herein, λg1 is a resonance wavelength of an upper-limit frequency in the operating band of the antenna 30 in the wave dense medium 40, and λg2 is a resonance wavelength of a lower-limit frequency in the operating band of the antenna 30 in the wave dense medium 40.

In this way, the thickness D of the wave dense medium 40 is an integral multiple of a half wavelength of the antenna 30 in the wave dense medium 40, and the wave dense medium 40 forms a Fabry-Perot resonator. When the electromagnetic wave is reflected from the wave sparse medium to the wave dense medium, there is a phase difference of 180°, and when the electromagnetic wave is transmitted from the wave sparse medium to the wave dense medium, there is a phase difference of 0°. When the electromagnetic wave is reflected from the wave dense medium to the wave sparse medium, there is a phase difference of 0°, and when the electromagnetic wave is transmitted from the wave dense medium to the wave sparse medium, there is a phase difference of 0°. To be specific, there is a phase difference of 180° between the first reflected electromagnetic wave c and the electromagnetic wave a, there is a phase difference of 0° between the electromagnetic wave a and the first transmitted electromagnetic wave b, there is a phase difference of 0° between the first transmitted electromagnetic wave b and the second reflected electromagnetic wave e, and there is a phase difference of 0° between the second reflected electromagnetic wave e and the third transmitted electromagnetic wave f. Therefore, in FIG. 5, there is exactly a phase difference of 180° between the first reflected electromagnetic wave b and the third transmitted electromagnetic wave f, and this is represented as interference cancelation. Therefore, the Fabry-Perot resonator can implement an anti-reflection effect, and can increase a gain of the antenna 30.

In some embodiments, n=1. In this way, the wave dense medium 40 has a small thickness D, and can be installed in a communications device with limited space, to implement thinning of the communications device.

In some embodiments, the thickness D of the wave dense medium 40 may be less than or equal to 2 mm. In this way, installation of the wave dense medium 40 in the communications device with limited space can be facilitated, to ensure thinning of the communications device. Based on this, optionally, the thickness D of the wave dense medium 40 is further greater than or equal to 0.1 mm. In this way, structural strength of the wave dense medium 40 can be ensured without affecting thinning of the communications device, to facilitate installation in the communications device. Specifically, the thickness D of the wave dense medium 40 may be 0.1 mm, 0.2 mm, 0.4 mm, 0.6 mm, 0.8 mm, 1.0 mm, 1.2 mm, 1.3 mm, 1.4 mm, 1.5 mm, 1.6 mm, 1.7 mm, 1.8 mm, 1.9 mm, or 2.0 mm.

To achieve the foregoing objective, when the antenna 30 is a mm Wave band (for example, the band n257: 26.5 GHZ-29.5 GHZ: the band n258: 24.25 GHZ-27.5 GHZ: or the band n260: 37 GHZ-40 GHZ) antenna, the value of DK of the wave dense medium 40 may be greater than or equal to 14 and less than or equal to 40. In this way, when n=1 and the antenna 30 is a mmWave band antenna, the operating band of the antenna 30 is within 24 GHZ~40 GHZ, and the thickness D of the wave dense medium 40 is approximately 1 mm. The structural strength of the wave dense medium 40 can be ensured without affecting thinning of the communications device.

In some embodiments, a material of the wave dense medium 40 includes but is not limited to zirconia ceramic and alumina ceramic. Dielectric constants DK of the zirconia ceramic and the alumina ceramic may be 26-35. When n=1, the thickness D of the wave dense medium 40 is approximately 1 mm, so that the structural strength of the wave dense medium 40 can be ensured without affecting thinning of the communications device.

In some embodiments, as shown in FIG. 4, a spacing (to be specific, a height h of an air gap) between the wave dense medium 40 and the antenna 30 is greater than 0 mm and less than 10 mm. In this way, small impact is exerted on thinning of the communications device 100, and an effect of increasing the gain of the antenna 30 by the wave dense medium 40 is good. Based on this, further optionally, the height h is greater than 0.02 mm and less than 3 mm. In this way, small impact is exerted on thinning of the communications device 100, and an effect of increasing the gain of the antenna 30 by the wave dense medium 40 is better. Further optionally, the height h is greater than or equal to 0.5 mm and less than or equal to 1 mm. In this way, smaller impact is exerted on thinning of the communications device 100, and an effect of increasing the gain of the antenna 30 by the wave dense medium 40 is better.

In some embodiments, an orthogonal projection of the antenna 30 on the back cover 21 is a first projection, an orthogonal projection of the wave dense medium 40 on the back cover 21 is a second projection, and the first projection overlaps the second projection. In this way, the wave dense medium 40 is located in the transmission direction of the antenna 30, and is directly opposite to the antenna 30, so that the gain of the antenna 30 can be increased. That the first projection overlaps the second projection indicates that a part of the first projection overlaps a part of the second projection; or the entire first projection overlaps a part of the second projection: or a part of the first projection overlaps the entire second projection: or the entire first projection overlaps the entire second projection.

In some embodiments, an area of the second projection is greater than an area of the first projection, an edge of the second projection is located outside an edge of the first projection, and the edge of the second projection and the edge of the first projection are spaced apart.

Figure 6:
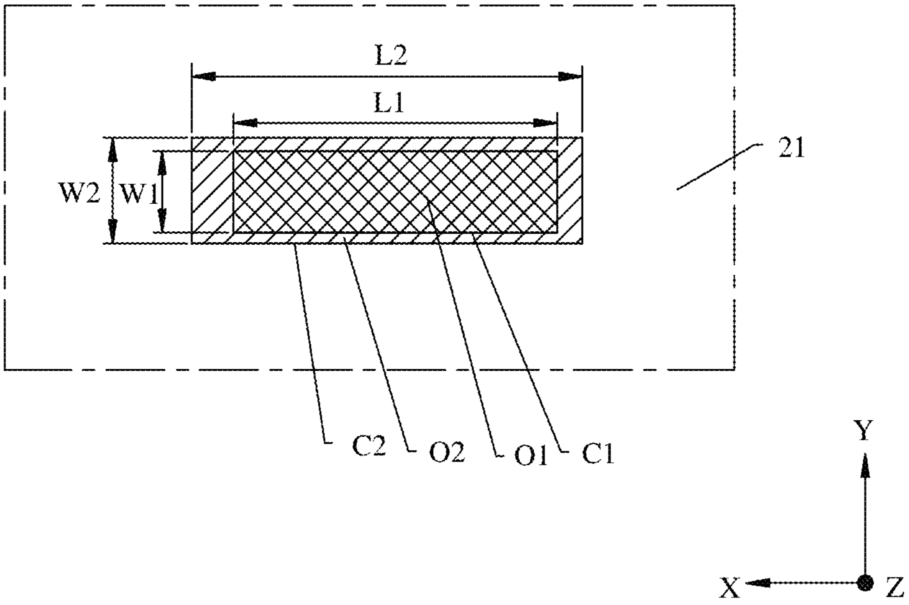
FIG. 6 is a schematic diagram of an orthogonal projection of an antenna on a back cover and an orthogonal projection of a wave dense medium on a back cover in the communications device shown in FIG. 2 and FIG. 3.

For example, as shown in FIG. 1-FIG. 3, the antenna 30 is in a rectangular plate shape, and the wave dense medium 40 is in a rectangular sheet shape. FIG. 6 is a schematic diagram of an orthogonal projection (that is, a first projection O1) of the antenna 30 on the back cover 21 and an orthogonal projection (that is, a second projection O2) of the wave dense medium 40 on the back cover 21 in the communications device 100 shown in FIG. 2 and FIG. 3. Both the first projection O1 and the second projection O2 are rectangular, a length direction of the first projection O1 is the same as a length direction of the second projection O2, and a width direction of the first projection O1 is the same as a width direction of the second projection O2. The first projection O1 is located within the second projection O2, a length L1 of the first projection O1 is less than a length L2 of the second projection O2, a width W1 of the first projection O1 is less than a width W2 of the second projection O2, and an edge C1 of the first projection O1 and an edge C2 of the second projection O2 are spaced apart. In this way, a size of the wave dense medium 40 exceeds a size of the antenna 30, and the wave dense medium 40 can cover the antenna 30, so that the gain of the antenna 30 can be increased as much as possible.

Figure 7:
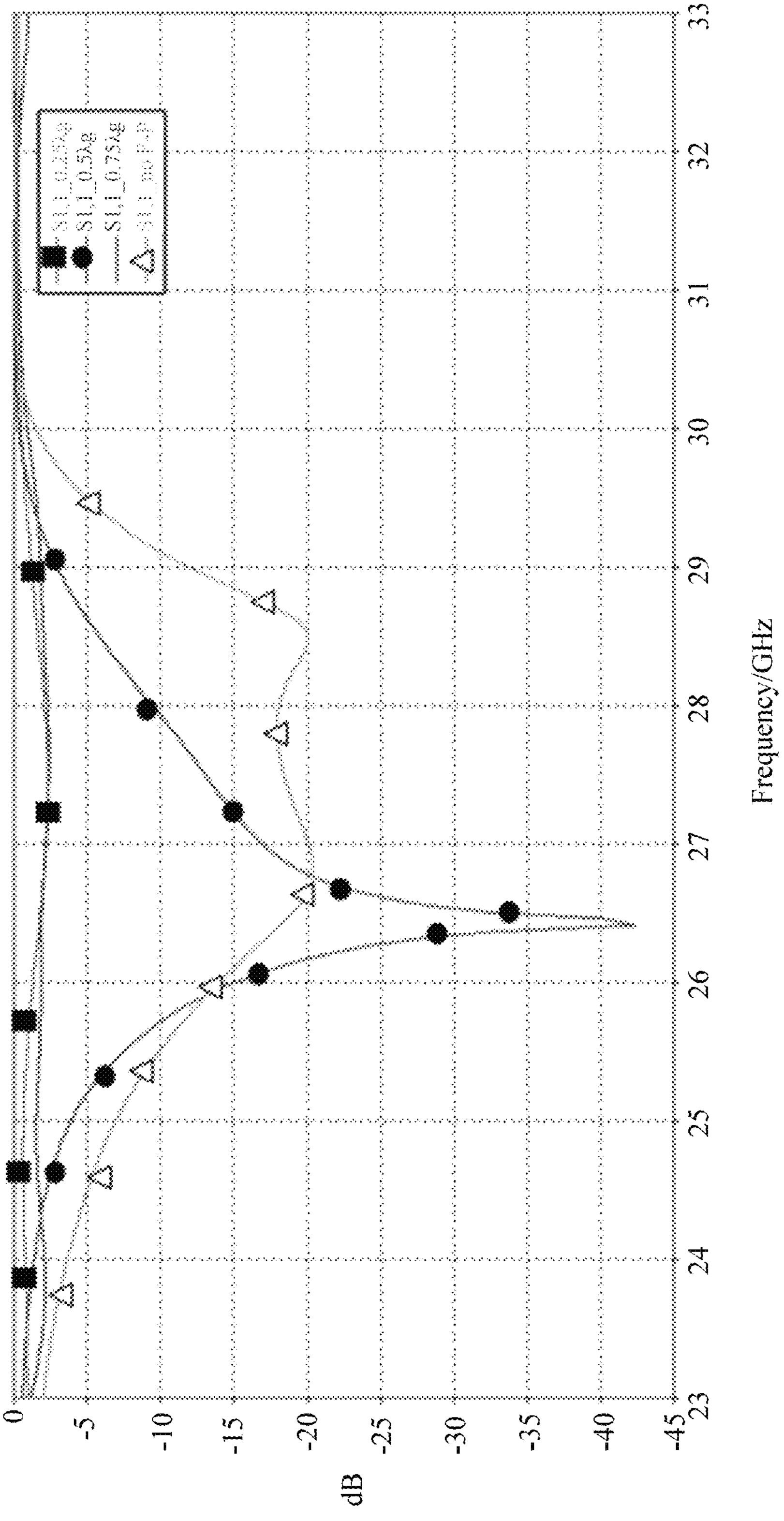
FIG. 7 shows input return losses of an antenna that exist when no wave dense medium is disposed and when a wave dense medium is disposed in the communications device shown in FIG. 1 to FIG. 3.

Based on the foregoing descriptions, to verify the effect of increasing the gain of the antenna 30 by the wave dense medium 40, reference is made to FIG. 7. FIG. 7 shows input return losses S11 of the antenna 30 that exist when no wave dense medium 40 is disposed and when the wave dense medium 40 is disposed in the communications device 100 shown in FIG. 1 to FIG. 3. Specifically, S11_no F-P indicates an input return loss that is of the antenna 30 and that exists when no wave dense medium 40 is disposed in the communications device 100: S11_0.25λg indicates an input return loss that is of the antenna 30 and that exists when the wave dense medium 40 is disposed in the communications device 100 and a thickness of the wave dense medium 40 is 0.25% g: S11_0.5λg indicates an input return loss that is of the antenna 30 and that exists when the wave dense medium 40 is disposed in the communications device 100 and a thickness of the wave dense medium 40 is 0.5 λg; and S11_0.75 λg indicates an input return loss that is of the antenna 30 and that exists when the wave dense medium 40 is disposed in the communications device 100 and a thickness of the wave dense medium 40 is 0.75% g. It can be learned from FIG. 5 that when the thickness of the wave dense medium 40 is away from 0.5 λg, S11 of the antenna 30 obviously deteriorates; and when the thickness of the wave dense medium 40 is close to 0.5λg, although a bandwidth becomes narrower, S11<−10 dB can be ensured at a resonant frequency. This may indicate that the wave dense medium 40 has a wave-transmitting effect, and the gain of the antenna 30 can be increased.

Figure 8A:
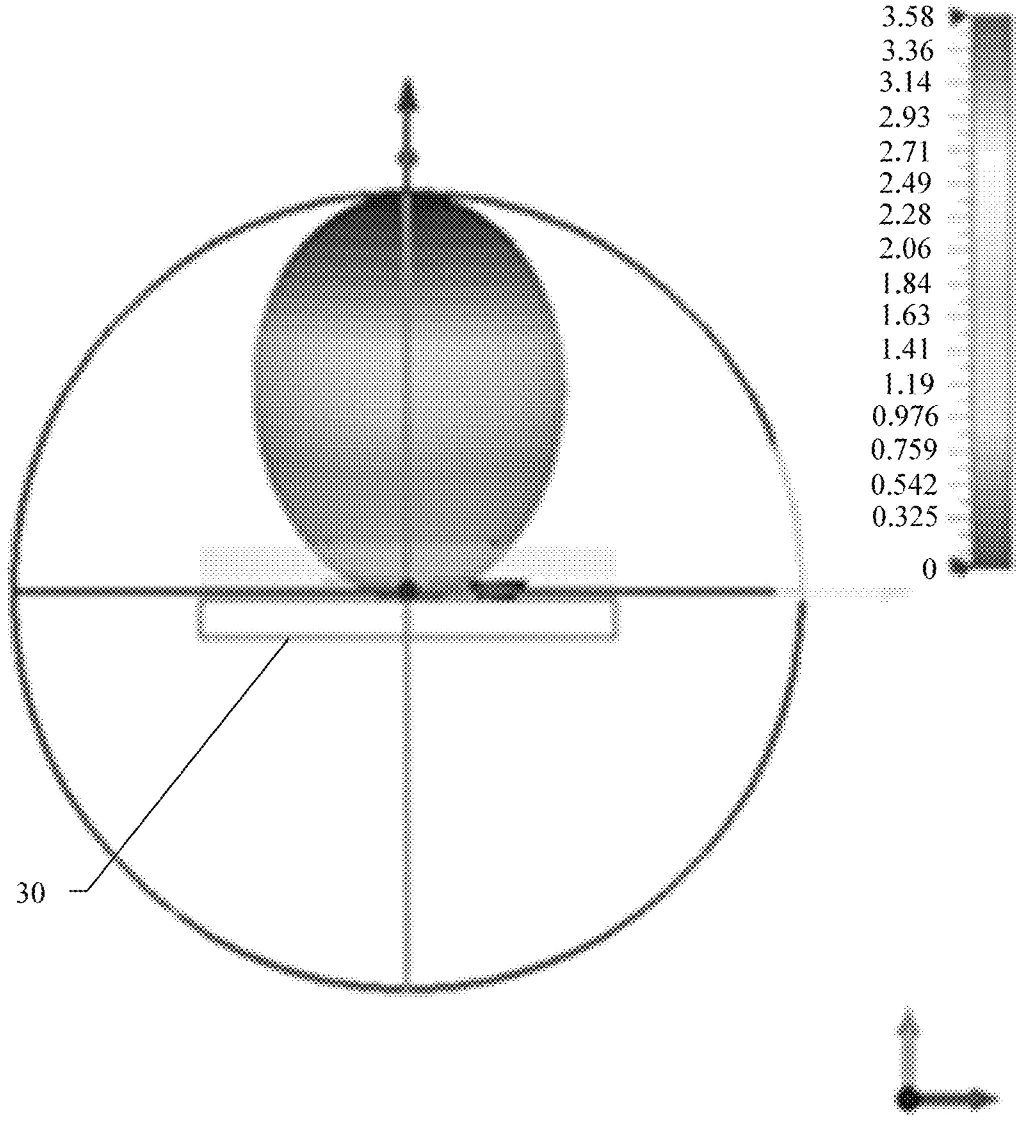
FIG. 8A and FIG. 8B are directivity diagrams of an antenna at 26 GHz when no wave dense medium is disposed and when a wave dense medium is disposed in the communications device shown in FIG. 1 to FIG. 3, where
Figure 8B:
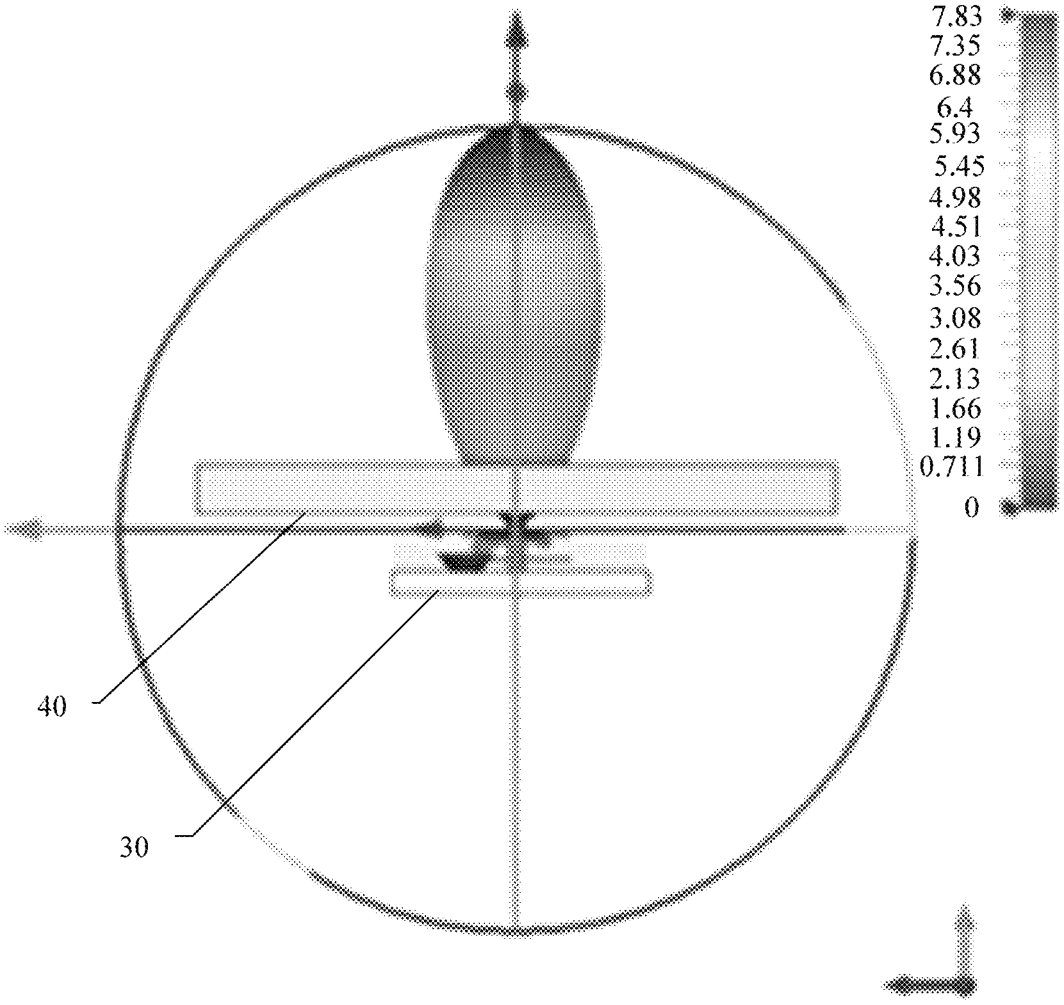

FIG. 8A and FIG. 8B are directivity diagrams of the antenna 30 at 26 GHz when no wave dense medium 40 is disposed and when the wave dense medium 40 is disposed in the communications device 100 shown in FIG. 1-FIG. 3. Specifically, FIG. 8A is a directivity diagram of the antenna 30 at 26 GHz when no wave dense medium 40 is disposed, and FIG. 8B is a directivity diagram of the antenna 30 at 26 GHz when the wave dense medium 40 is disposed. A thickness of the wave dense medium 40 is close to 0.5 λg. It can be learned from FIG. 8A that when no wave dense medium 40 is disposed, the gain (gain) of the antenna 30 is 3.6 dBi; and it can be learned from FIG. 8B that when the wave dense medium 40 is disposed, the gain of the antenna 30 is 7.8 dBi. The gain is increased by approximately 4.2 dBi.

Figure 9A:
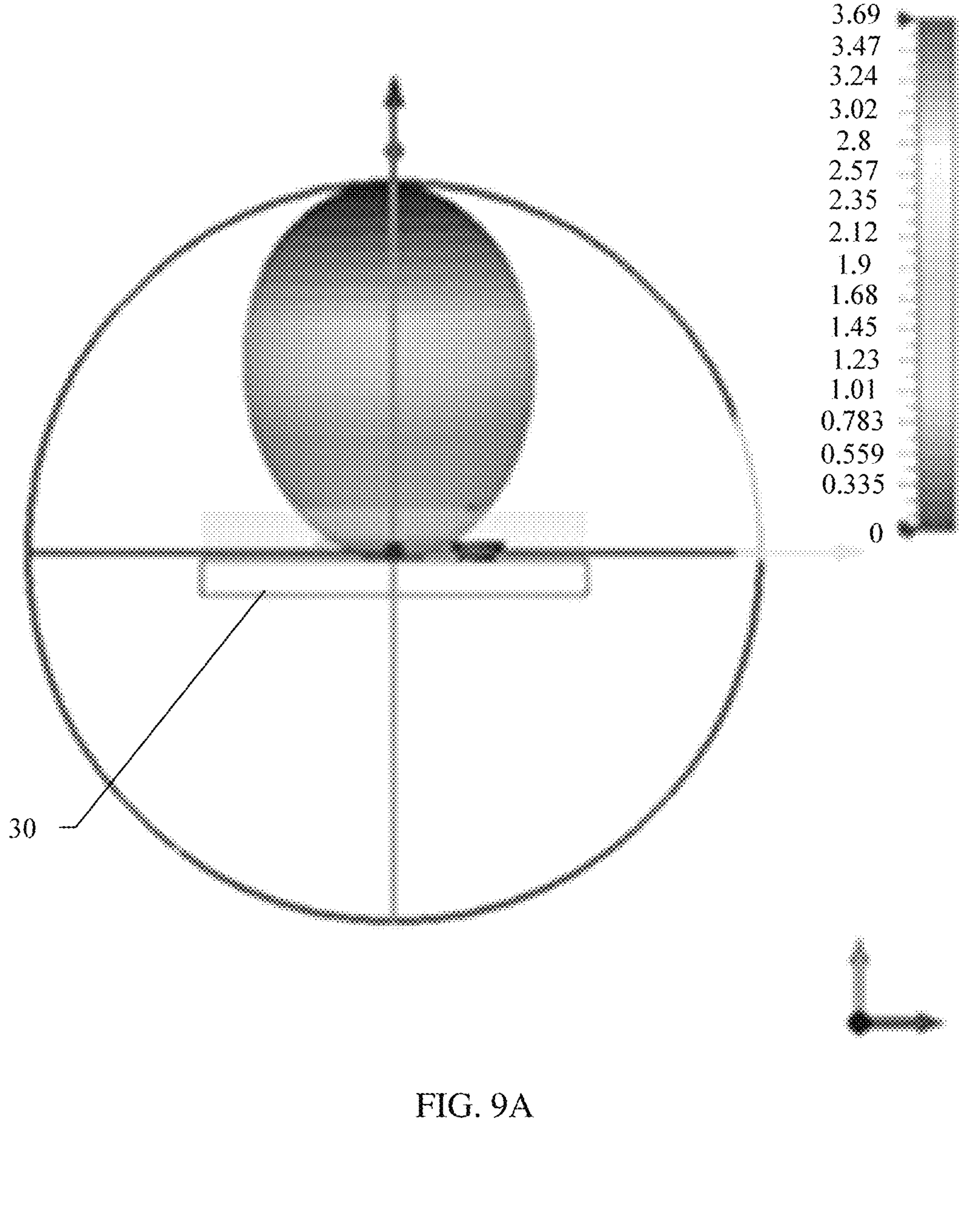
FIG. 9A and FIG. 9B are directivity diagrams of an antenna at 28 GHz when no wave dense medium is disposed and when a wave dense medium is disposed in the communications device shown in FIG. 1 to FIG. 3, where
Figure 9B:
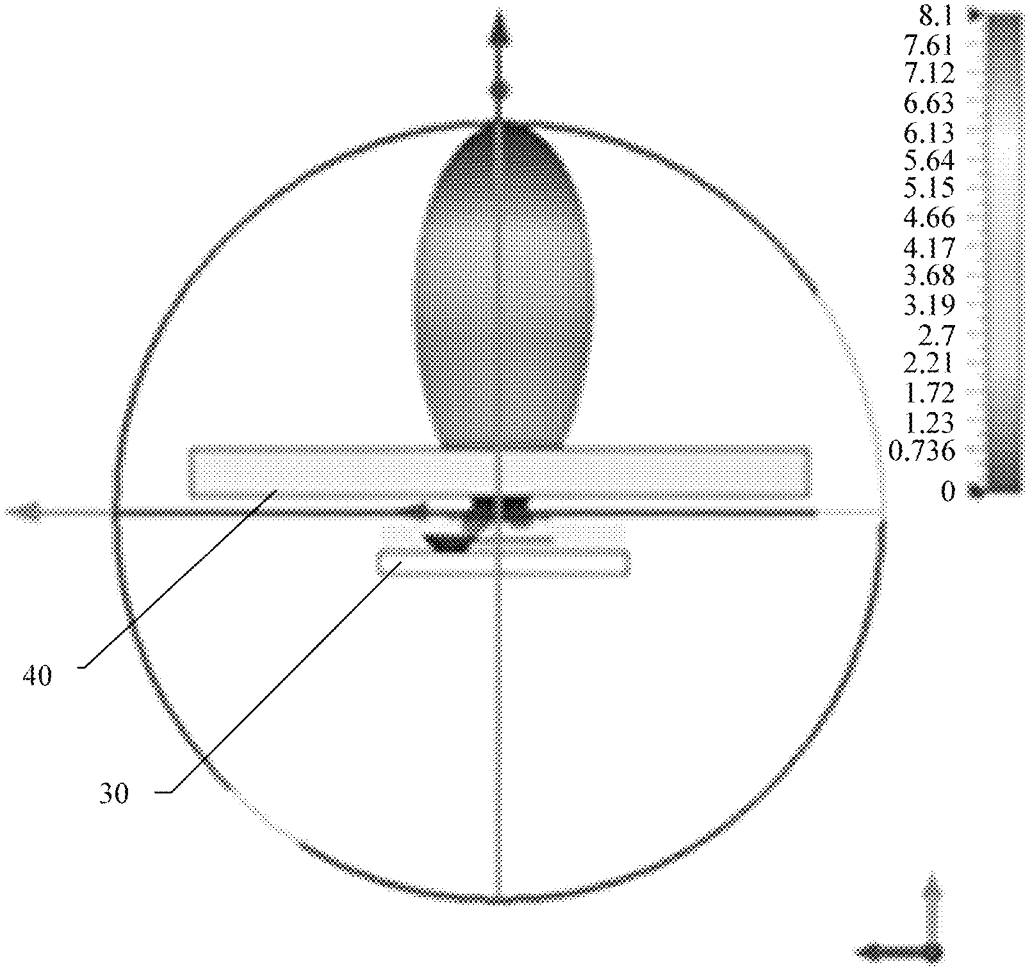

FIG. 9A and FIG. 9B are directivity diagrams of the antenna 30 at 28 GHz when no wave dense medium 40 is disposed and when the wave dense medium 40 is disposed in the communications device 100 shown in FIG. 1-FIG. 3. Specifically, FIG. 9A is a directivity diagram of the antenna 30 at 28 GHz when no wave dense medium 40 is disposed, and FIG. 9B is a directivity diagram of the antenna 30 at 28 GHz when the wave dense medium 40 is disposed. A thickness of the wave dense medium 40 is close to 0.5 λg. It can be learned from FIG. 9A that when no wave dense medium 40 is disposed, the gain (gain) of the antenna 30 is 3.7 dBi; and it can be learned from FIG. 8B that when the wave dense medium 40 is disposed, the gain of the antenna 30 is 8.1 dBi. The gain is increased by approximately 4.4 dBi.

Because in the communications device 100 shown in FIG. 1-FIG. 3, the size of the wave dense medium 40 exceeds the size of the antenna 30, and a size of a reference ground layer of the modular antenna 30 is less than or equal to the size of the antenna 30, the size of the wave dense medium 40 exceeds the size of the reference ground layer of the antenna 30. Based on this, the size of the reference ground layer may be increased, so that energy that is of an electromagnetic field and that extends outwards in the wave dense medium 40 is emitted as much as possible in a direction in which the wave dense medium 40 is away from the reference ground layer, to further increase the gain of the antenna 30. To optimize the size of the reference ground layer of the antenna 30 without affecting modularization of the antenna 30, in some embodiments, the reference ground layer of the antenna 30 may be electrically connected to the middle plate 23 with a large size or a reference ground layer in the circuit board, to increase the size of the reference ground layer of the antenna 30, so as to further increase the gain of the antenna 30.

Figure 10:
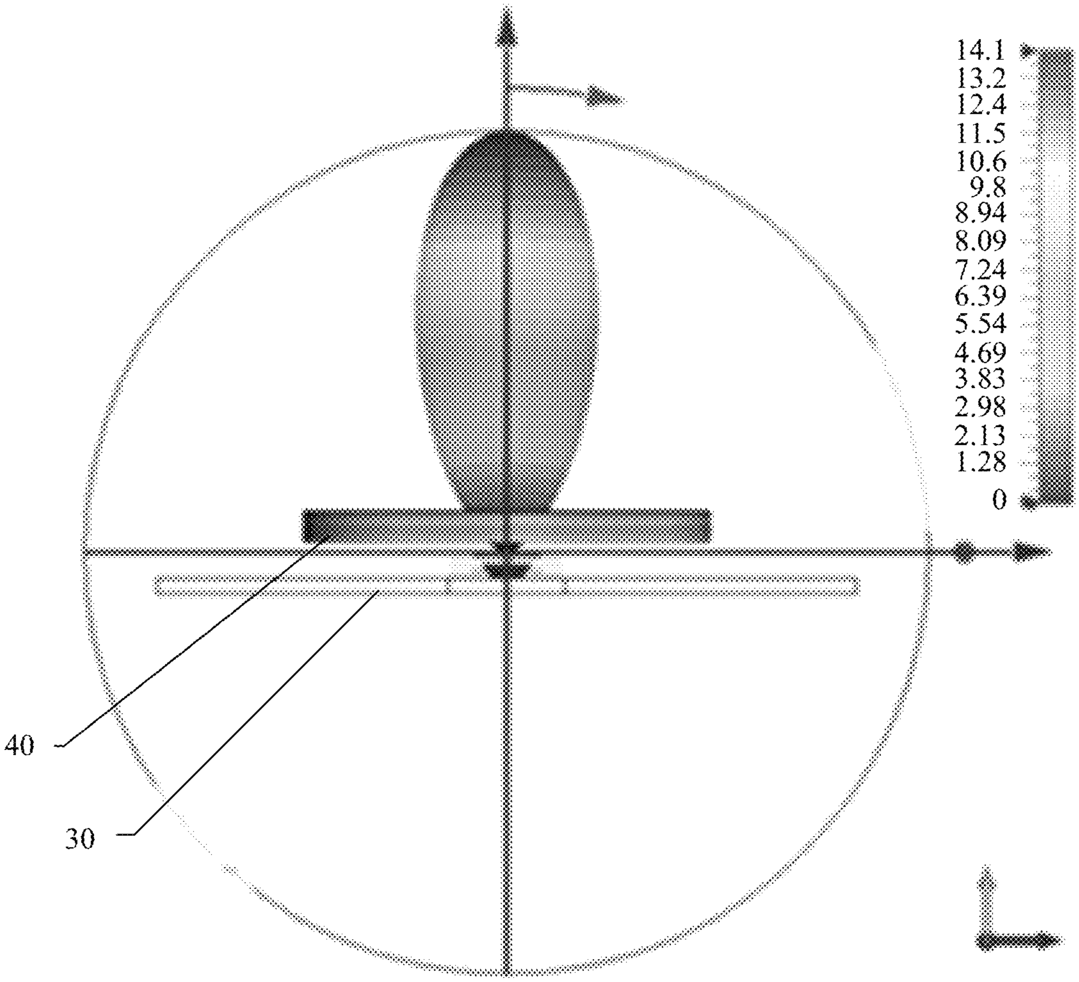
FIG. 10 is a directivity diagram of an antenna at 26 GHz when a wave dense medium is disposed in the communications device shown in FIG. 1 to FIG. 3 and after a size of a reference ground layer of the antenna is optimized.
Figure 11:
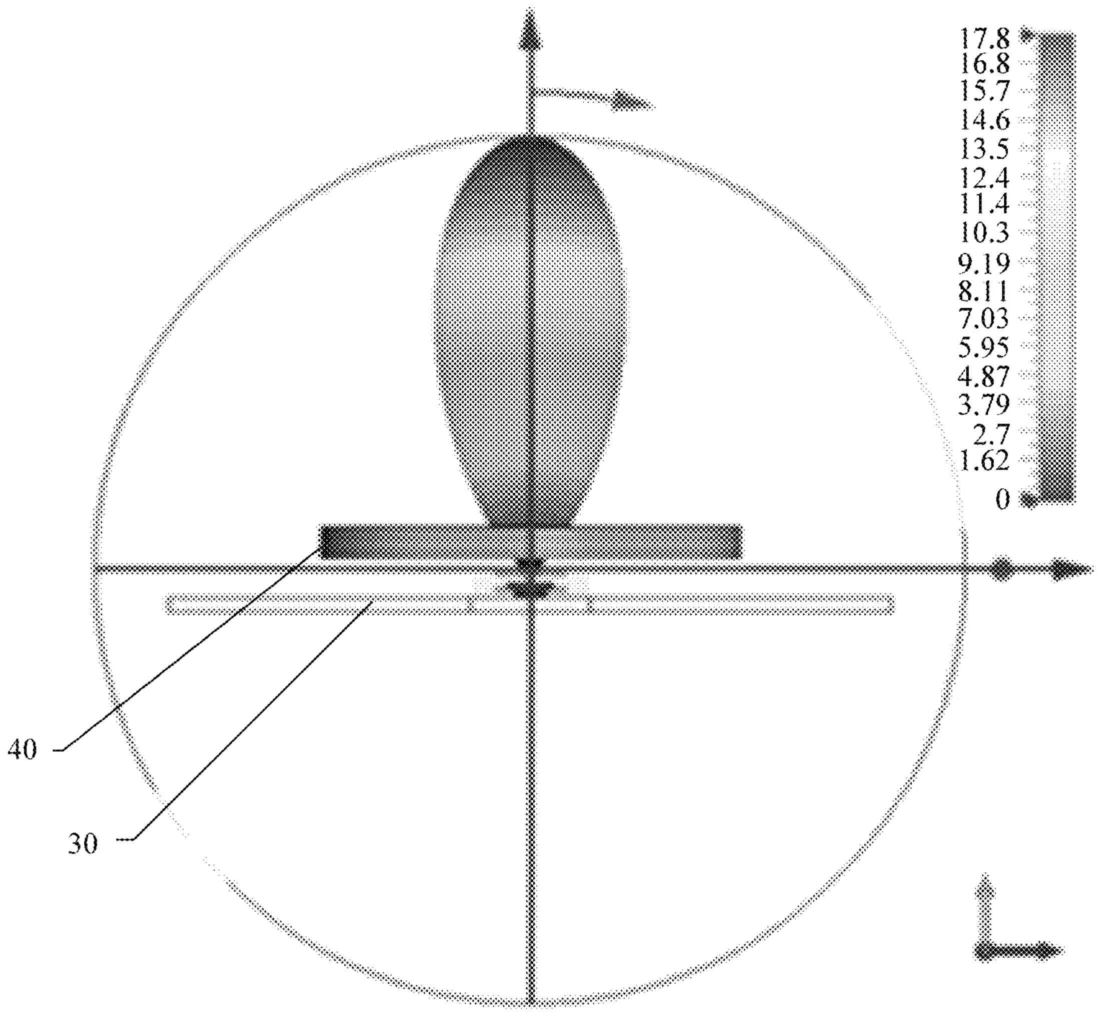
FIG. 11 is a directivity diagram of an antenna at 28 GHz when a wave dense medium is disposed in the communications device shown in FIG. 1 to FIG. 3 and after a size of a reference ground layer of the antenna is optimized.

Refer to FIG. 10 and FIG. 11. FIG. 10 is a directivity diagram of the antenna 30 at 26 GHZ when the wave dense medium 40 is disposed in the communications device 100 shown in FIG. 1-FIG. 3 and after the size of the reference ground layer of the antenna 30 is optimized. FIG. 11 is a directivity diagram of the antenna 30 at 28 GHz when the wave dense medium 40 is disposed in the communications device 100 shown in FIG. 1-FIG. 3 and after the size of the reference ground layer of the antenna 30 is optimized. It can be learned from FIG. 10 and FIG. 11 that, when the wave dense medium 40 is disposed and after the size of the reference ground layer of the antenna 30 is optimized, the gain of the antenna 30 at 26 GHz is increased from 7.8 dBi to 14.1 dBi, and the gain of the antenna 30 at 28 GHz is increased from 8.1 dBi to 17.8 dBi. Therefore, the gain of the antenna 30 is further increased.

Figure 12:
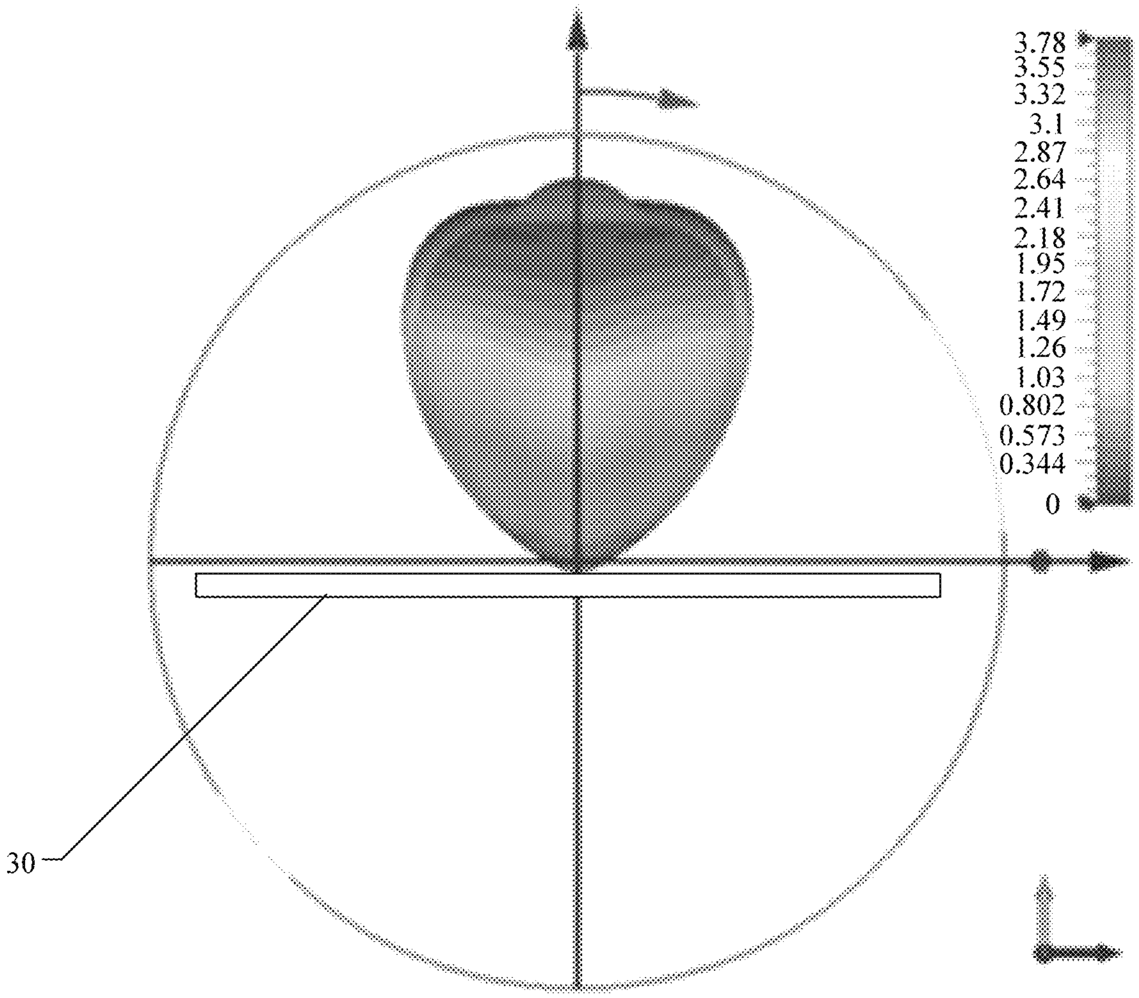
FIG. 12 is a directivity diagram of an antenna at 26 GHz when no wave dense medium is disposed in the communications device shown in FIG. 1 to FIG. 3 but a size of a reference ground layer of the antenna is optimized.
Figure 13:
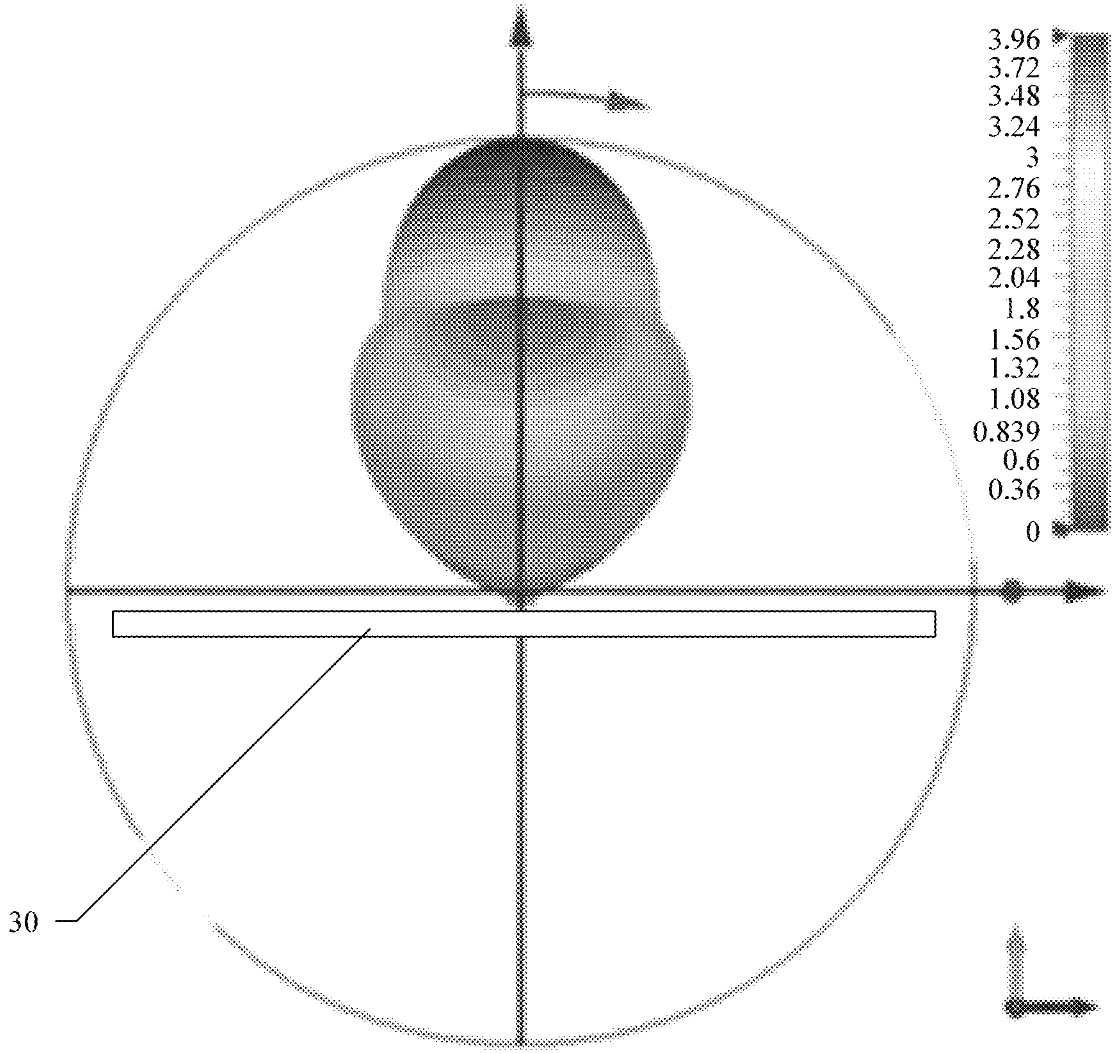
FIG. 13 is a directivity diagram of an antenna at 28 GHz when no wave dense medium is disposed in the communications device shown in FIG. 1 to FIG. 3 but a size of a reference ground layer of the antenna is optimized.

It should be noted that, when no wave dense medium 40 is disposed but the size of the reference ground layer of the antenna 30 is optimized, reference is made to FIG. 12 and FIG. 13. FIG. 12 is a directivity diagram of the antenna 30 at 26 GHz when no wave dense medium 40 is disposed in the communications device 100 shown in FIG. 1-FIG. 3 but the size of the reference ground layer of the antenna 30 is optimized. FIG. 13 is a directivity diagram of the antenna 30 at 28 GHz when no wave dense medium 40 is disposed in the communications device 100 shown in FIG. 1-FIG. 3 but the size of the reference ground layer of the antenna 30 is optimized. It can be learned from FIG. 12 and FIG. 13 that the gain is slightly increased after the size of the reference ground layer of the antenna 30 is optimized. Specifically, the gain of the antenna 30 is increased from 3.6 dBi to 3.8 dBi at 26 GHz, and the gain of the antenna 30 is increased from 3.7 dBi to 4.0 dBi at 28 GHz. However, the directivity diagram is also distorted. It can be learned that, when the wave dense medium 40 is disposed, the size of the reference ground layer of the antenna 30 is further optimized, so that the gain can be greatly increased.

In the foregoing embodiments, an example in which the antenna 30 may transmit a signal to the side that is of the back cover 21 and that is away from the screen 10 and the wave dense medium 40 is disposed on the inner surface of the back cover 21 is described. According to the foregoing descriptions, alternatively, the wave dense medium 40 may be disposed in the region that is on the back cover 21 and that is opposite to the antenna 30, or may be disposed on the side that is of the back cover 21 and that is away from the antenna 30. In addition, alternatively, the antenna 30 may transmit a signal to the side that is of the frame 22 and that is away from the internal accommodation space of the communications device 100, or transmit a signal to the side that is of the screen 10 and that is away from the back cover 21. Based on this, the wave dense medium 40 may be disposed on an inner surface of the frame 22 or the screen 10, in the region opposite to the antenna 30, or on the side that is away from the antenna 30.

Figure 14:
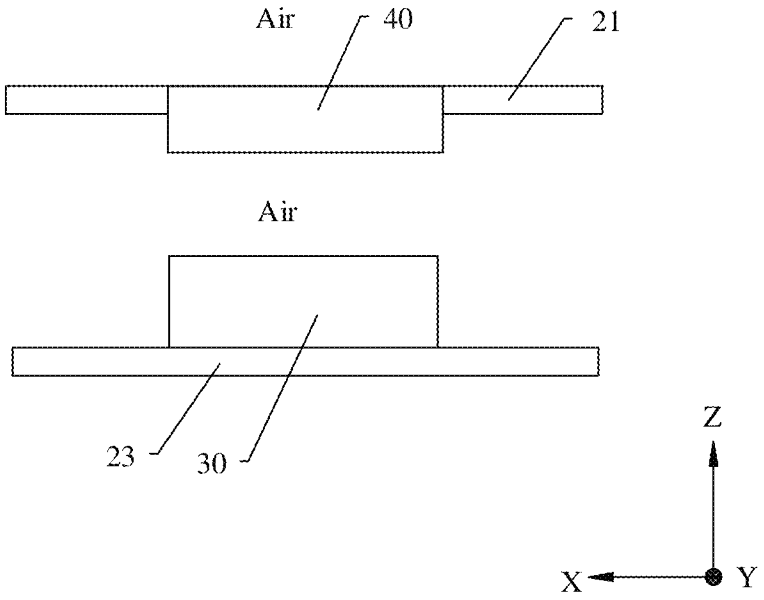
FIG. 14 is a schematic diagram of relative positions of a middle plate, a back cover, an antenna, and a wave dense medium in a communications device according to some other embodiments of this application.

FIG. 14 is a schematic diagram of relative positions of the middle plate 23, the back cover 21, the antenna 30, and the wave dense medium 40 in the communications device 100 according to some other embodiments of this application. In this embodiment, the wave dense medium 40 is built in the region that is on the back cover 21 and that is opposite to the antenna 30. In this way, a thickness of the communications device can be reduced, and thinning of the communications device can be facilitated.

In the foregoing embodiment, a hole that is on the back cover 21 and that is used to build the wave dense medium 40 may be a blind hole, or may be a through hole. When the hole that is on the back cover 21 and that is used to build the wave dense medium 40 is a blind hole, the blind hole may penetrate through an inner surface of the back cover 21, and may not penetrate through an outer surface of the back cover 21: or may penetrate through an outer surface of the back cover 21, and may not penetrate through an inner surface of the back cover 21. This is not specifically limited herein. When the hole that is on the back cover 21 and that is used to build the wave dense medium 40 is a blind hole, and the blind hole penetrates through the inner surface of the back cover 21, and does not penetrate through the outer surface of the back cover 21, a part of the wave dense medium 40 is located on an inner side of the back cover 21, and the other part is built into the blind hole. When the hole that is on the back cover 21 and that is used to build the wave dense medium 40 is a blind hole, and the blind hole penetrates through the outer surface of the back cover 21, and does not penetrate through the inner surface of the back cover 21, a part of the wave dense medium 40 is located on an outer side of the back cover 21, and the other part is built into the blind hole.

When the hole that is on the back cover 21 and that is used to build the wave dense medium 40 is a through hole, a surface that is of the wave dense medium 40 and that is away from the antenna 30 may be flush with an outer surface of the back cover 21, or may protrude to an outer side of the back cover 21. In the embodiment shown in FIG. 14, the surface that is of the wave dense medium 40 and that is away from the antenna 30 is flush with the outer surface of the back cover 21. In this way, appearance neatness of the communications device 100 can be improved.

In the foregoing embodiment, the outer surface of the back cover 21 is the surface that is of the back cover 21 and that is away from the internal accommodation space of the communications device 100, that is, the surface that is of the back cover 21 and that is away from the screen 10. The outer side of the back cover 21 is a side that is of the outer surface of the back cover 21 and that is away from an inner surface of the back cover 21. Correspondingly, an inner side of the back cover 21 is a side that is of the inner surface of the back cover 21 and that is away from the outer surface of the back cover 21.

When the hole that is on the back cover 21 and that is used to build the wave dense medium 40 is a through hole, a wave sparse medium located on a side that is of the wave dense medium 40 and that is close to the antenna 30 is air, and a wave sparse medium located on a side that is of the wave dense medium 40 and that is away from the antenna 30 is also air. A dielectric constant DK of air is small and is approximately 1, and therefore, small impact is exerted on an F-P effect of the wave dense medium 40.

Figure 15:
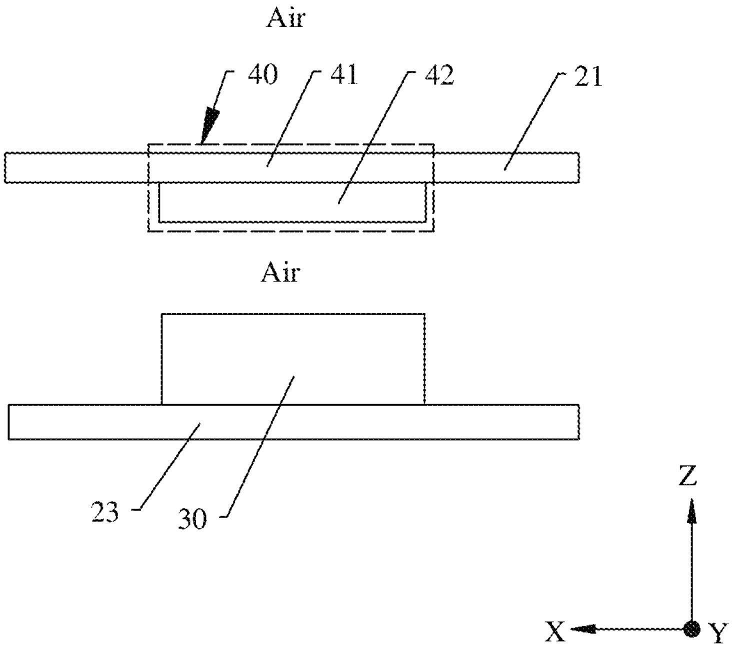
FIG. 15 is a schematic diagram of relative positions of a middle plate, a back cover, an antenna, and a wave dense medium in a communications device according to some other embodiments of this application.

FIG. 15 is a schematic diagram of relative positions of the middle plate 23, the back cover 21, the antenna 30, and the wave dense medium 40 in the communications device 100 according to some other embodiments of this application. In this embodiment, the wave dense medium 40 includes a first part 41 and a second part 42. The first part 41 includes a partial region of the back cover 21. The second part 42 is located between the first part 41 and the antenna 30, and the second part 42 is disposed on a surface (that is, an inner surface of the first part 41) that is of the first part 41 and that is close to the antenna 30. In this way, a sum of a thickness of the first part 41 and a thickness of the second part 42 is the thickness D of the wave dense medium 40, and this also facilitates thinning of the communications device. In addition, because the second part 42 is disposed on a surface that is of the first part 41 and that is close to the antenna 30, an appearance of the communications device is not affected.

Figure 16:
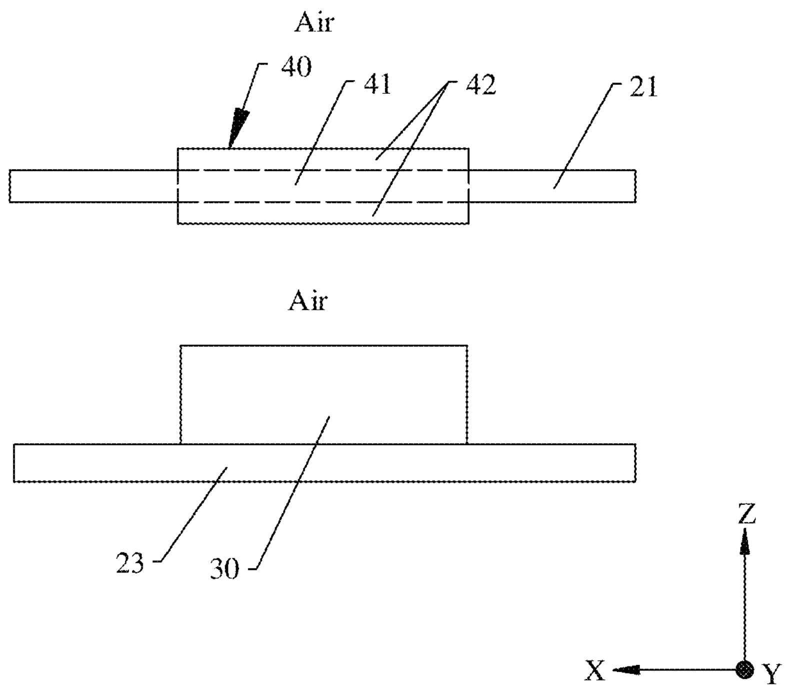
FIG. 16 is a schematic diagram of relative positions of a middle plate, a back cover, an antenna, and a wave dense medium in a communications device according to some other embodiments of this application.

In some other embodiments, the second part 42 may alternatively be disposed on a surface (that is, an outer surface of the first part 41) that is of the first part 41 and that is away from the antenna 30. Alternatively, FIG. 16 is a schematic diagram of relative positions of the middle plate 23, the back cover 21, the antenna 30, and the wave dense medium 40 in the communications device 100 according to some other embodiments of this application. In this embodiment, a part of the second part 42 is disposed on the inner surface of the first part 41, and the other part is disposed on the outer surface of the first part 41.

In some embodiments, still as shown in FIG. 16, the first part 41 and the second part 42 are integrally formed. In this way, complexity of a composition structure of the communications device can be reduced, and assembly efficiency can be improved.

In the embodiments shown in FIG. 15 and FIG. 16, a wave sparse medium located on the side that is of the wave dense medium 40 and that is close to the antenna 30 is air, and a wave sparse medium located on the side that is of the wave dense medium 40 and that is away from the antenna 30 is also air. A dielectric constant DK of air is small and is approximately 1, and therefore, small impact is exerted on an F-P effect of the wave dense medium 40.

Figure 17:
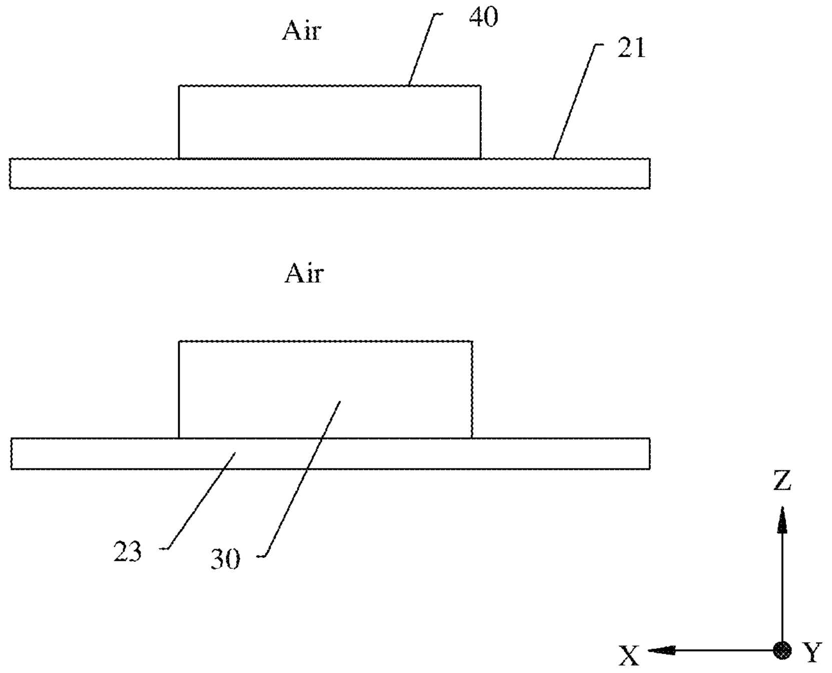
FIG. 17 is a schematic diagram of relative positions of a middle plate, a back cover, an antenna, and a wave dense medium in a communications device according to some other embodiments of this application.

FIG. 17 is a schematic diagram of relative positions of the middle plate 23, the back cover 21, the antenna 30, and the wave dense medium 40 in the communications device 100 according to some other embodiments of this application. In this embodiment, the wave dense medium 40 is located on the side that is of the back cover 21 and that is away from the antenna 30. In other words, the wave dense medium 40 is located on the outer side of the back cover 21. Specifically, the wave dense medium 40 is disposed on the outer surface of the back cover 21. In this way, the wave dense medium 40 does not occupy the internal accommodation space of the communications device, to avoid compressing installation space of another component in the communications device.

In the foregoing embodiment, a wave sparse medium located on the side that is of the wave dense medium 40 and that is close to the antenna 30 is the back cover 21, and a wave sparse medium located on the side that is of the wave dense medium 40 and that is away from the antenna 30 is air. Based on this, optionally, a material of the back cover 21 may be plastic or glass, and the plastic and the glass each have a small dielectric constant, and each exert small impact on an F-P effect of the wave dense medium 40.

Figure 18:
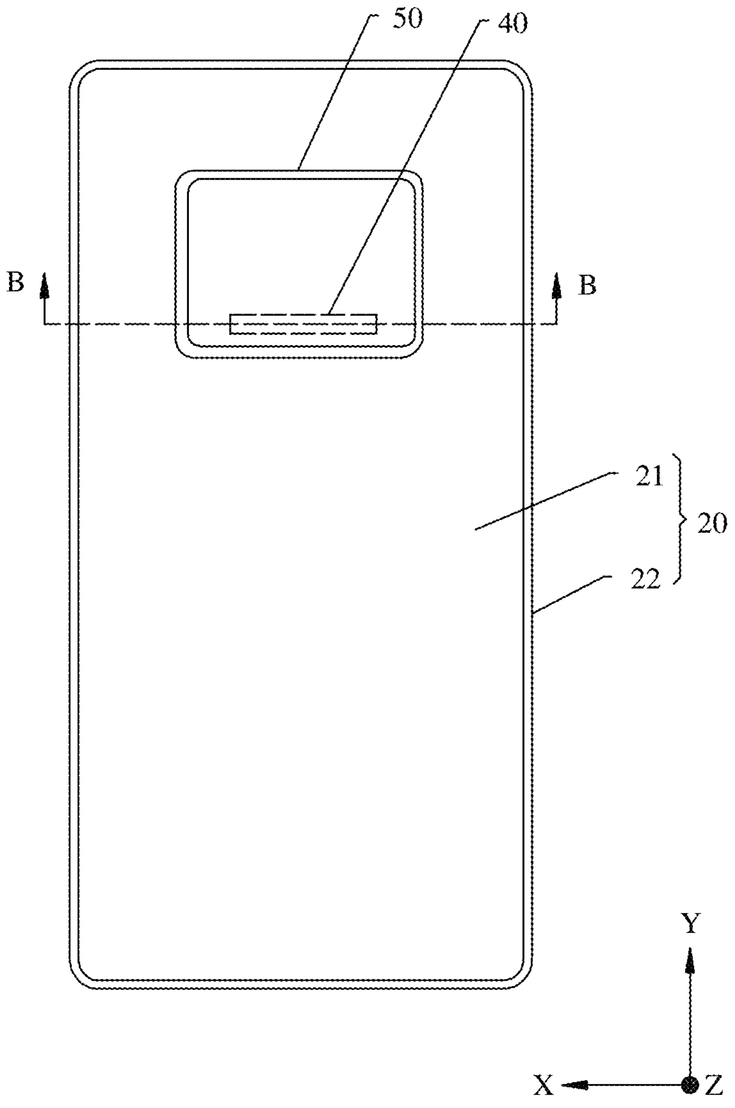
FIG. 18 is a schematic diagram of a structure of a rear face of a communications device according to some other embodiments of this application.
Figure 19:
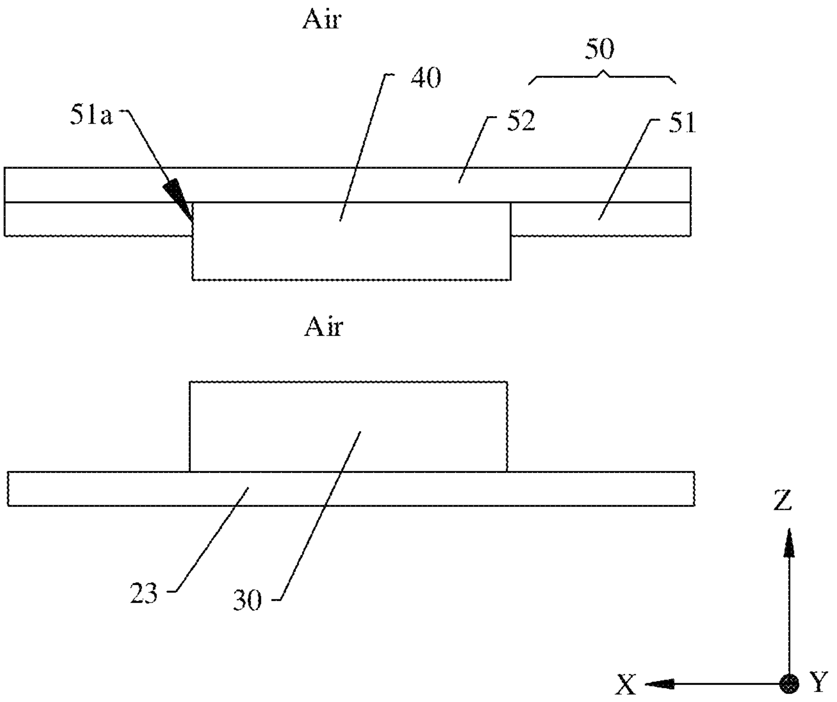
FIG. 19 is a schematic diagram of a cross-sectional structure of the communications device shown in FIG. 18 in a direction B-B.

FIG. 18 is a schematic diagram of a structure of a rear face of the communications device 100 according to some other embodiments of this application. In this embodiment, the communications device 100 further includes a camera decoration element 50, and the camera decoration element 50 is disposed on the back cover 21. In some embodiments, a signal transmission direction of the antenna 30 points to the camera decoration element 50. Based on this, reference is made to FIG. 19. FIG. 19 is a schematic diagram of a cross-sectional structure of the communications device 100 shown in FIG. 18 in a direction B-B. The camera decoration element 50 includes a decoration element body 51 and a light-transmitting plate 52 disposed on a side that is of the decoration element body 51 and that is away from the antenna 30. The decoration element body 51 is provided with a first mounting hole 51*a*. A part of the wave dense medium 40 is located on a side that is of the camera decoration element 50 and that is close to the antenna 30, and the other part of the wave dense medium 40 is mounted in the first mounting hole 51*a* of the decoration element body 51. In this way, a thickness of the communications device 100 can be reduced to some extent, and appearance consistency of the camera decoration part 50 can be ensured.

Figure 20:
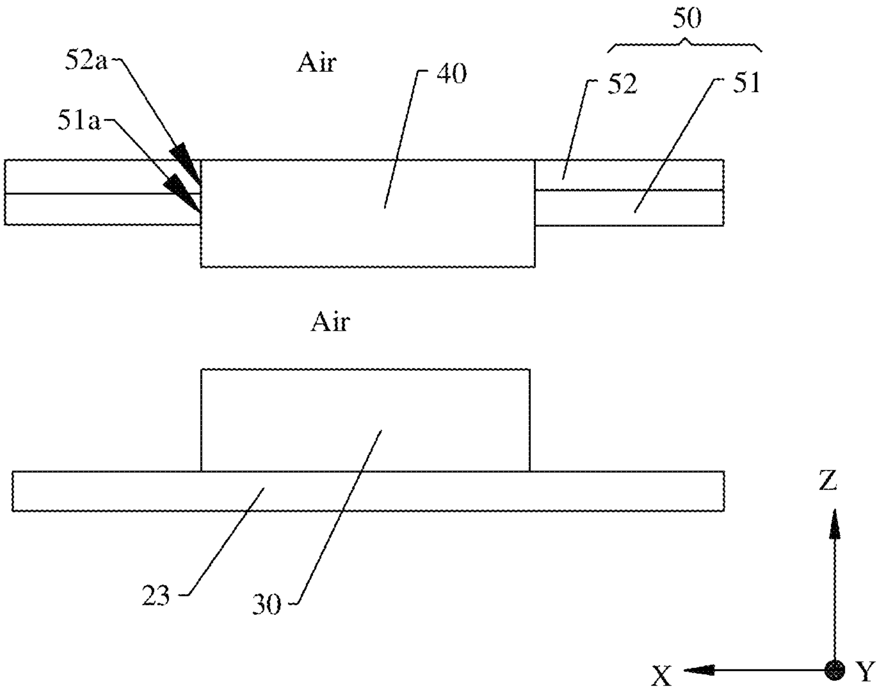
FIG. 20 is a schematic diagram of relative positions of a middle plate, a camera decoration element, an antenna, and a wave dense medium in a communications device according to some other embodiments of this application.

FIG. 20 is a schematic diagram of relative positions of the middle plate 23, the camera decoration element 50, the antenna 30, and the wave dense medium 40 in the communications device 100 according to some other embodiments of this application. In this embodiment, the decoration element body 51 is provided with the first mounting hole 51*a*, and the light-transmitting plate 52 is provided with a second mounting hole 52*a*. A part of the wave dense medium 40 is installed in the first mounting hole 51*a* of the decoration element body 51, a part of the wave dense medium 40 is installed in the second mounting hole 52*a* of the light-transmitting plate 52, and a remaining part of the wave dense medium 40 is located on a side that is of the camera decoration element 50 and that is close to the antenna 30. In this way, a thickness of the communications device 100 can be greatly reduced.

Figure 21:
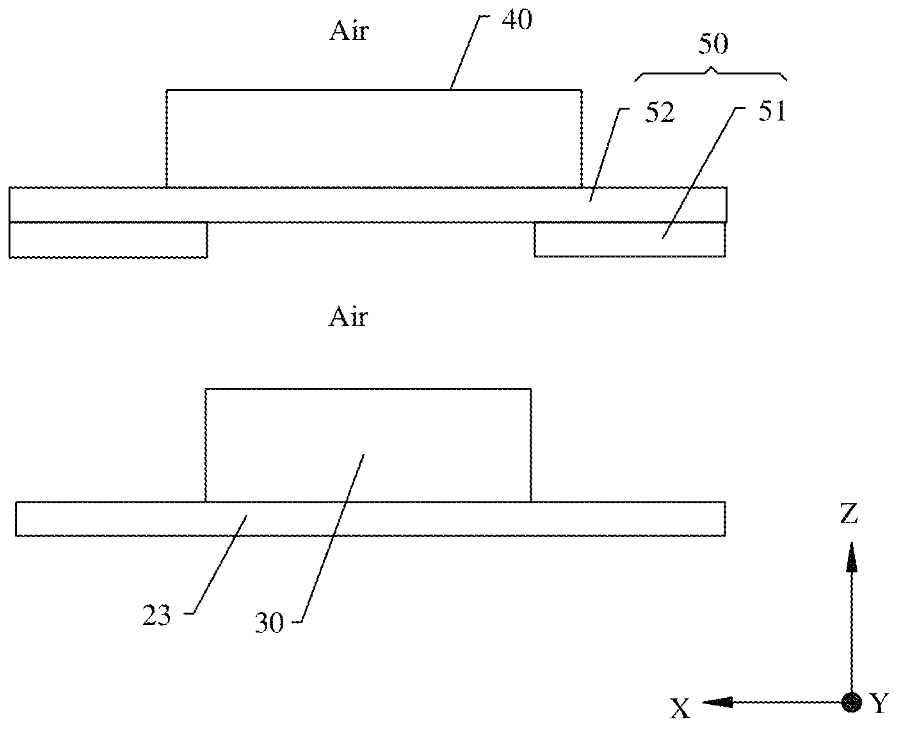
FIG. 21 is a schematic diagram of relative positions of a middle plate, a camera decoration element, an antenna, and a wave dense medium in a communications device according to some other embodiments of this application.

FIG. 21 is a schematic diagram of relative positions of the middle plate 23, the camera decoration element 50, the antenna 30, and the wave dense medium 40 in the communications device 100 according to some other embodiments of this application. In this embodiment, the wave dense medium 40 is located on a side that is of the camera decoration element 50 and that is away from the antenna 30. In other words, the wave dense medium 40 is located on an outer side of the camera decoration element 50. Specifically, the wave dense medium 40 is disposed on an outer surface of the camera decoration element 50. In this way, the wave dense medium 40 does not occupy the internal accommodation space of the communications device, to avoid compressing installation space of another component in the communications device.

Figure 22:
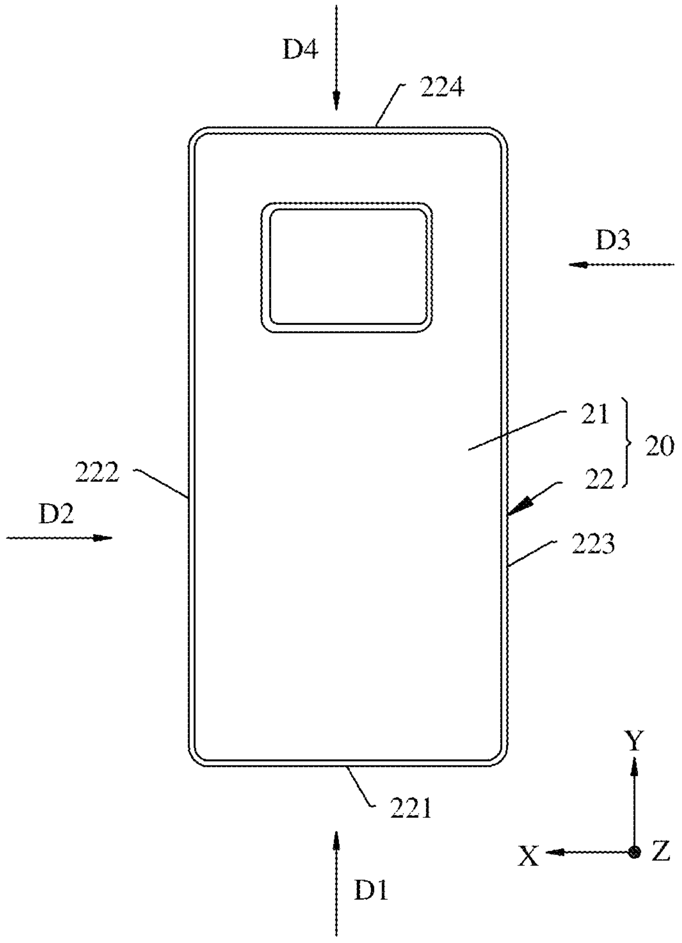
FIG. 22 is a schematic diagram of a structure of a rear face of a communications device according to some other embodiments of this application.
Figure 23:
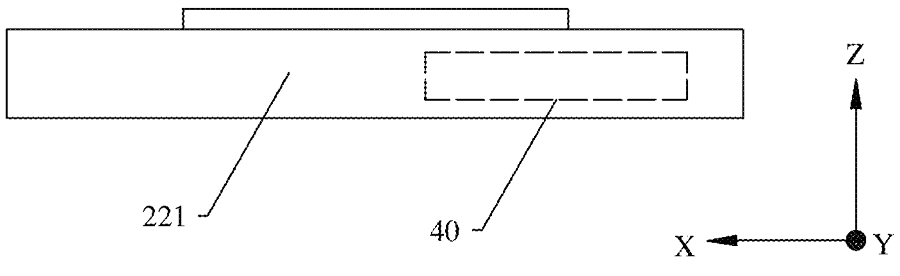
FIG. 23 is a schematic diagram of a structure existing when the communications device shown in FIG. 22 is viewed from a direction D1.
Figure 24:
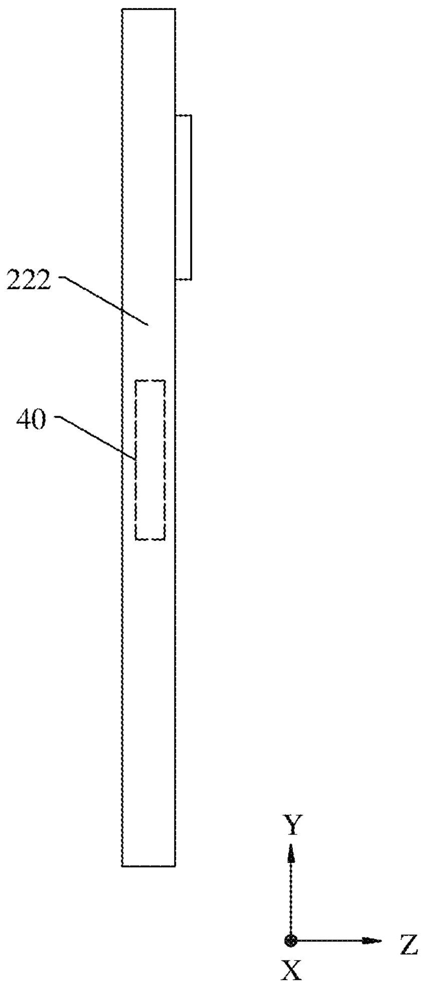
FIG. 24 is a schematic diagram of a structure existing when the communications device shown in FIG. 22 is viewed from a direction D2.
Figure 25:
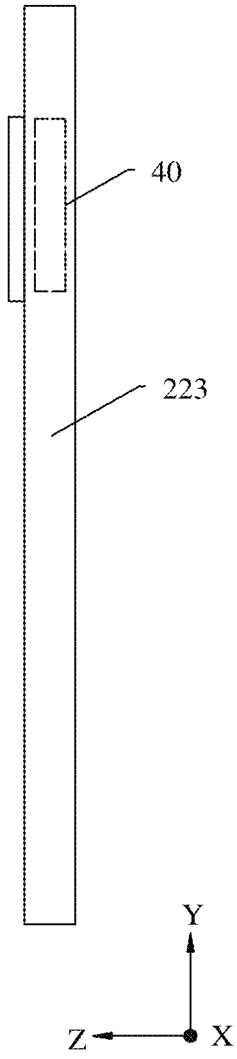
FIG. 25 is a schematic diagram of a structure existing when the communications device shown in FIG. 22 is viewed from a direction D3.
Figure 26:
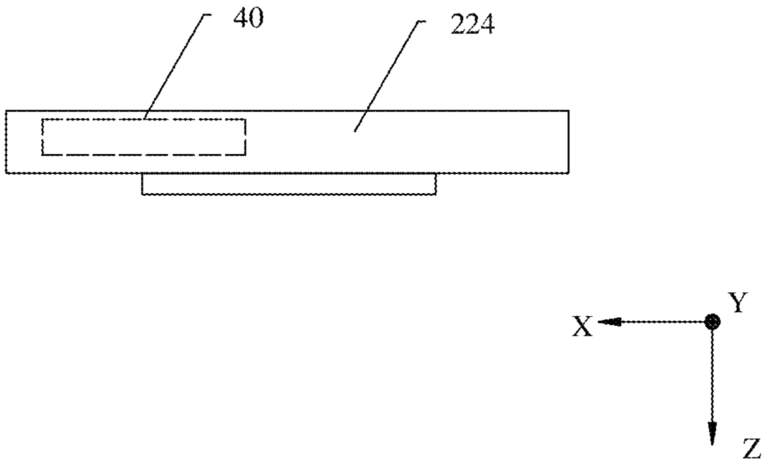
FIG. 26 is a schematic diagram of a structure existing when the communications device shown in FIG. 22 is viewed from a direction D4.

When the antenna 30 transmits a signal to the side that is of the frame 22 and that is away from the internal accommodation space of the communications device 100, reference is made to FIG. 22. FIG. 22 is a schematic diagram of a structure of a rear face of the communications device 100 according to some other embodiments of this application. The frame 22 includes a lower frame 221, a left frame 222, a right frame 223, and an upper frame 224. FIG. 23 is a schematic diagram of a structure existing when the communications device 100 shown in FIG. 22 is viewed from a direction D1. In this embodiment, the antenna 30 transmits a signal to a side that is of the lower frame 221 and that is away from the internal accommodation space of the communications device 100, and the wave dense medium 40 is disposed on an inner surface of the lower frame 221, is built into the lower frame 221, is integrally formed with the lower frame 221, or is disposed on an outer surface of the lower frame 221. In some other embodiments, reference is made to FIG. 24-FIG. 26. FIG. 24 is a schematic diagram of a structure existing when the communications device 100 shown in FIG. 22 is viewed from a direction D2. FIG. 25 is a schematic diagram of a structure existing when the communications device 100 shown in FIG. 22 is viewed from a direction D3. FIG. 26 is a schematic diagram of a structure existing when the communications device 100 shown in FIG. 22 is viewed from a direction D4. Alternatively, the antenna 30 may transmit a signal to a side that is of the left frame 222, the right frame 223, or the upper frame 224 and that is away from the internal accommodation space of the communications device 100. In this way, the wave dense medium 40 is disposed on an inner surface of the left frame 222, the right frame 223, or the upper frame 224, is built into the left frame 222, the right frame 223, or the upper frame 224, or is disposed on an outer surface of the left frame 222, the right frame 223, or the upper frame 224.

In the communications device described in the foregoing embodiments, there may be one antenna 30; or there may be a plurality of antennas 30, and the plurality of antennas 30 are disposed in an array. When there are a plurality of antennas 30, a corresponding wave dense medium 40 may be separately disposed for each antenna 30; or a same wave dense medium 40 may be disposed for the plurality of antennas 30, and the wave dense medium 40 may cover the plurality of antennas 30, to increase gains of the plurality of antennas 30. This is not specifically limited herein.

Figure 27:
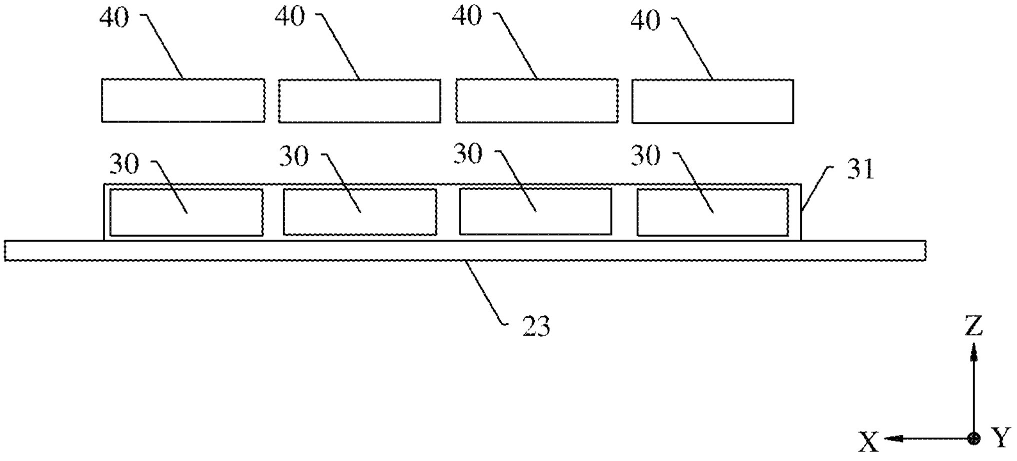
FIG. 27 is a schematic diagram of relative positions of an antenna, a wave dense medium, and a middle plate in a communications device according to some other embodiments of this application.

For example, reference is made to FIG. 27. FIG. 27 is a schematic diagram of relative positions of the antenna 30, the wave dense medium 40, and the middle plate 23 in the communications device 100 according to some other embodiments of this application. There are a plurality of antennas 30, and the plurality of antennas 30 are integrated into a same bearing medium 31. In some embodiments, the bearing medium 31 may be formed by sequentially alternating and stacking an insulating medium layer and a metal layer, and the antenna 30 includes a metal layer in the bearing medium 31 and a metal via hole connected between a plurality of metal layers. Each antenna 30 corresponds to one wave dense medium 40, and wave dense media 40 corresponding to the plurality of antennas 30 are independent of each other. In this way, a single wave dense medium 40 has a small volume, and the single wave dense medium 40 has low costs.

Figure 28:
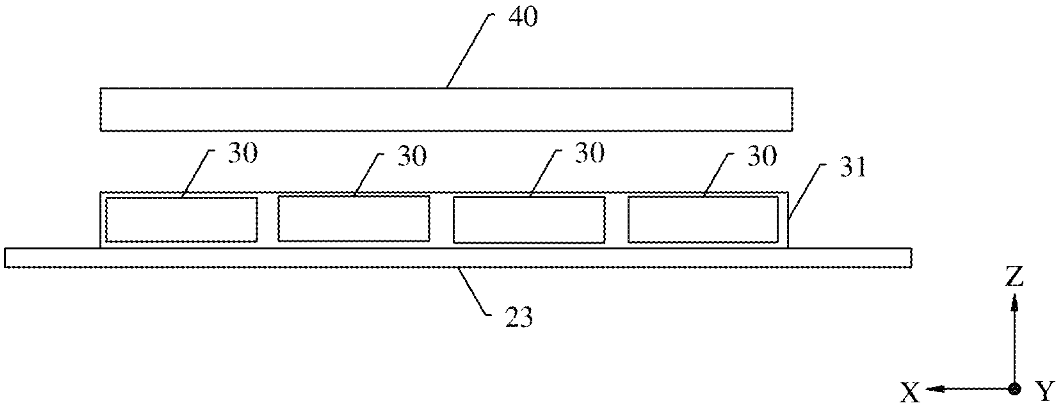
FIG. 28 is a schematic diagram of relative positions of an antenna, a wave dense medium, and a middle plate in a communications device according to some other embodiments of this application.

For another example, reference is made to FIG. 28. FIG. 28 is a schematic diagram of relative positions of the antenna 30, the wave dense medium 40, and the middle plate 23 in the communications device 100 according to some other embodiments of this application. There are a plurality of antennas 30, and the plurality of antennas 30 are also integrated into a same bearing medium 31. The plurality of antennas 30 correspond to a same wave dense medium 40, and the wave dense medium 30 can cover the plurality of antennas 30, to increase gains of the plurality of antennas 30. In this way, there is a quantity of wave dense media 40, complexity of a composition structure of the communications device is low, assembly difficulty is small, and efficiency is high.

In the descriptions of this specification, specific features, structures, materials, or characteristics may be combined in any one or more embodiments or examples in a proper manner.

Finally, it should be noted that the foregoing embodiments are only used to illustrate the technical solutions of this application, but are not used to limit this application. Although this application is described in detail with reference to the foregoing embodiments, it should be understood by a person of ordinary skill in the art that the technical solutions described in the foregoing embodiments may still be modified, or some technical features thereof are equivalently replaced. These modifications or replacements do not make the essence of the corresponding technical solutions depart from the spirit and scope of the technical solutions of the embodiments of this application.

What is claimed is:

1. A communications device, comprising an antenna and a wave dense medium, wherein the wave dense medium is located in a transmission direction of the antenna and is spaced apart from the antenna, a dielectric constant of a medium, in the communications device, located on a side that is of the wave dense medium and that is close to the antenna and a dielectric constant of a medium located on a side that is of the wave dense medium and that is away from the antenna are both less than a dielectric constant of the wave dense medium, and a thickness D of the wave dense medium from a surface that is close to the antenna to a surface that is away from the antenna satisfies $0.5n\lambda g1(1-10\%)\leq D\leq 0.5n\lambda g2(1+10\%)$, wherein n=1, 2, 3, . . . , λg1 is a resonance wavelength of an upper limit frequency in an operating band of the antenna in the wave dense medium, and λg2 is a resonance wavelength of a lower limit frequency in an operating band of the antenna in the wave dense medium, wherein the thickness D of the wave dense medium is less than or equal to 2 mm and is greater than or equal to 0.1 mm, and wherein the dielectric constant DK of the wave dense medium is greater than or equal to 14 and less than or equal to 40.

2. The communications device according to claim 1, wherein a material of the wave dense medium is zirconia ceramic or alumina ceramic.

3. The communications device according to claim 1, wherein n=1.

4. The communications device according to claim 1, wherein the antenna and the wave dense medium are spaced apart by air, and the air forms the medium, in the communications device, located on the side that is of the wave dense medium and that is close to the antenna.

5. The communications device according to claim 4, wherein a spacing between the antenna and the wave dense medium is greater than 0 mm and less than 10 mm.

6. The communications device according to claim 4, further comprising a back cover, wherein the antenna is located on an inner side of the back cover, the wave dense medium is located between the antenna and the back cover and is disposed on an inner surface of the back cover, and the back cover forms the medium, in the communications device, located on the side that is of the wave dense medium and that is away from the antenna.

7. The communications device according to claim 4, further comprising a back cover, wherein the antenna is located on an inner side of the back cover, and the wave dense medium is built in a region that is on the back cover and that is opposite to the antenna.

8. The communications device according to claim 4, further comprising a back cover, wherein the antenna is located on an inner side of the back cover, the wave dense medium comprises a first part and a second part, and the first part consists of a partial region of the back cover; and the second part is located between the first part and the antenna, and the second part is disposed on an inner surface of the first part; or the second part is located on a side that is of the first part and that is away from the antenna, and the second part is disposed on an outer surface of the first part; or a part of the second part is located between the first part and the antenna and is disposed on an inner surface of the first part, and the other part is located on a side that is of the first part and that is away from the antenna and is disposed on an outer surface of the first part.

9. The communications device according to claim 8, wherein the first part and the second part are integrally formed.

10. The communications device according to claim 1, further comprising a back cover, wherein the antenna is located on an inner side of the back cover, the wave dense medium is located on an outer side of the back cover, and the wave dense medium is disposed on an outer surface of the back cover.

11. The communications device according to claim 10, wherein an orthogonal projection of the antenna on the back cover is a first projection, and an orthogonal projection of the wave dense medium on the back cover is a second projection; and an area of the second projection is greater than an area of the first projection, an edge of the second projection is located outside an edge of the first projection, and the edge of the second projection and the edge of the first projection are spaced apart.

12. The communications device according to claim 1, wherein the antenna is a millimeterwave band antenna.

* * * * *